(12) United States Patent
Choi et al.

(10) Patent No.: US 8,722,280 B2
(45) Date of Patent: May 13, 2014

(54) HYPER-BRANCHED POLYMER, ELECTRODE FOR FUEL CELL INCLUDING THE HYPER-BRANCHED POLYMER, ELECTROLYTE MEMBRANE FOR FUEL CELL INCLUDING THE HYPER-BRANCHED POLYMER, AND FUEL CELL INCLUDING AT LEAST ONE OF THE ELECTRODE AND THE ELECTROLYTE MEMBRANE

(75) Inventors: Seong-woo Choi, Yongin-si (KR); Cheol-hee Ahn, Seoul (KR); Jung-ock Park, Yongin-si (KR); Mi-jung Yim, Seoul (KR)

(73) Assignees: Samsung Electronics Co., Ltd. (KR); SNU R&DB Foundation (KR)

( * ) Notice: Subject to any disclaimer, the term of this patent is extended or adjusted under 35 U.S.C. 154(b) by 842 days.

(21) Appl. No.: 12/639,429

(22) Filed: Dec. 16, 2009

(65) Prior Publication Data
US 2010/0159347 A1    Jun. 24, 2010

(30) Foreign Application Priority Data
Dec. 16, 2008   (KR) .................. 10-2008-0128180

(51) Int. Cl.
   *H01M 8/10*   (2006.01)
(52) U.S. Cl.
   USPC ........... 429/494; 429/316; 429/317; 429/479; 521/27
(58) Field of Classification Search
   None
   See application file for complete search history.

(56) References Cited

FOREIGN PATENT DOCUMENTS

| EP | 1 160 267 | 12/2001 |
|----|-----------|---------|
| EP | 1 760 110 | 3/2007 |
| GB | 999 134 | 7/1965 |
| JP | 5-283082 | 10/1993 |
| JP | 2000-082507 A | 3/2000 |
| JP | 2003-231749 | 8/2003 |
| JP | 2005-070268 A | 3/2005 |

OTHER PUBLICATIONS

C. Pitois, et al.: "Functionalized Fluorinated Hyperbranched Polymers for Optical Waveguide Applications" Advanced Materials, vol. 13, No. 19, Oct. 1, 2001, pp. 1483-1487, XP002578507.
Timothy M. Miller et al.: "Dendritic analogs of engineering plastics: A general one-step synthesis of dendritic polyaryl ethers" Journal of the American Chemical Society, vol. 115, Jan. 1, 1993, pp. 356-357, XP002578508.
Timothy M. Miller et al.: "Synthesis and characterization of a series of monodisperse, 1, 3, 5-phenylene-based hydrocarbon dendrimers including $C_{276}H_{186}$ and their fluorinated analogs" Journal of the American Chemical Society, vol. 114, No. 3. Jan. 1, 1992, pp. 1018-1025, XP002578509.
European Search Report issued May 25, 2010, in corresponding European Patent No. 09179433.9.

(Continued)

*Primary Examiner* — Robert Xu
(74) *Attorney, Agent, or Firm* — Cantor Colburn LLP

(57) ABSTRACT

A hyper-branched polymer having a degree of branching in the range of about 0.05 to about 1 includes a dendritic unit, a linear unit, and a terminal unit, wherein the hyper-branched polymer, an electrode for a fuel cell including the hyper-branched polymer, an electrolyte membrane for a fuel cell including the hyper-branched polymer, and a fuel cell including at least one of the electrode and the electrolyte membrane. Such a hyper-branched polymer included in a fuel cell provides excellent thermal resistance and phosphoric acid resistance and increase the performance of the fuel cell.

23 Claims, 14 Drawing Sheets

(56) References Cited

OTHER PUBLICATIONS

Young H. Kim et al., "Hyperbranced Polyphenylenes", Macromolecules, American Chemical Society, vol. 25, No. 21, Oct. 12, 1992, pp. 5561-5572.

Yutaka Amao et al., "Novel optical oxygen sensing material: platinum octaethylporphyrin immobilized in a copolymer film of isobutyl methacrylate and tetrafluoropropyl methacrylate", Reactive & Functional Polymers 47 (2001), pp. 49-54.

Yutaka Amao et al, "Novel optical oxygen sensing material: platinum porphyrin-styrene-pentafluorostyrene copolymer film", The Royal Society of Chemistry 1999, Anal. Commun., 1999, 36, pp. 367-369.

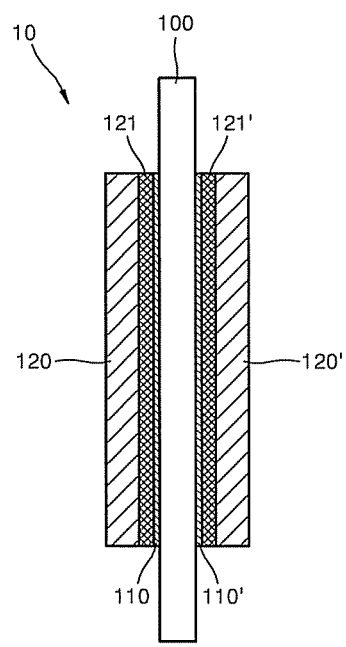

HYPER-BRANCHED POLYMER, ELECTRODE FOR FUEL CELL INCLUDING THE HYPER-BRANCHED POLYMER, ELECTROLYTE MEMBRANE FOR FUEL CELL INCLUDING THE HYPER-BRANCHED POLYMER, AND FUEL CELL INCLUDING AT LEAST ONE OF THE ELECTRODE AND THE ELECTROLYTE MEMBRANE

CROSS-REFERENCE TO RELATED APPLICATION

This application claims the benefit of Korean Patent Application No. 10-2008-0128180, filed Dec. 16, 2008, in the Korean Intellectual Property Office, the disclosure of which is incorporated herein in by reference.

BACKGROUND

1. Field

The present disclosure relates to a hyper-branched polymer, an electrode for a fuel cell including the hyper-branched polymer, an electrolyte membrane for a fuel cell including the hyper-branched polymer, and a fuel cell including at least one of the electrode and the electrolyte membrane.

2. Description of the Related Art

Fuel cells that include a polymer electrolyte membrane operate at relatively low temperatures and may be manufactured to be small in size. Thus, such fuel cells are expected to be used as energy sources in electric vehicles and in distributed generation systems. Perfluorocarbon sulfonic acid-based polymer membranes, such as NAFION® membranes (available from E.I. du Pont de Nemours and Company), are commonly used as polymer electrolyte membranes for fuel cells.

However, such polymer electrolyte membranes should be humidified in order to sufficiently conduct protons. In addition, to enhance cell system efficiencies, polymer electrolyte membranes should be operated at high temperatures, i.e., at least 100° C. However, the moisture in the polymer electrolyte membrane evaporates and is depleted at such temperatures, which reduces the effectiveness thereof.

To address such problems and/or other problems in the related art, non-humidified electrolyte membranes, which may operate at temperatures of at least 100° C., without humidification, have been developed. For example, a phosphoric acid doped polybenzimidazole non-humidified electrolyte membrane has been disclosed.

In addition, in cells that operate at low temperatures, such as the cells including a perfluorocarbon sulfonic acid-based polymer membrane, electrodes that include polytetrafluoroethylene (PTFE) as a waterproofing agent have been widely used to prevent gas diffusion in the electrodes due to formation of water produced as electricity is generated.

In addition, phosphoric acid fuel cells, which operate at temperatures in the range of from 150 to 200° C., include a liquid phosphoric acid electrolyte. However, the liquid phosphoric acid included in a large amount in the electrodes of the fuel cells interferes with gas diffusion in the electrodes. Therefore, an electrode catalyst layer that includes a polytetrafluoroethylene (PTFE) waterproofing agent has been used to prevent fine pores in the electrodes from being clogged by the phosphoric acid.

In addition, in fuel cells including a polybenzimidazole (PBI) electrolyte membrane, which uses a phosphoric acid as a non-humidified electrolyte, in order to reduce contact between electrodes and the electrolyte membrane, a method of impregnating the electrodes with a liquid phosphoric acid has been used, and a method of increasing a loading amount of metal catalysts has been used. However, such fuel cells do not exhibit improved properties.

In addition, when a phosphoric acid-doped solid polymer electrolyte is used, and air is supplied to the cathode, an activation time thereof is about 1 week, even when an optimized electrode composition is used. Although the performance of the solid polymer electrolyte may be improved and an activation time may be shortened by supplying oxygen to the anode instead of air, such supplying of oxygen is undesirable for commercial use. In addition, a homogeneous polymer electrolyte membrane using the PBI is not satisfactory in terms of mechanical characteristics, chemical stability, or capability of retaining a phosphoric acid. Thus, there is a demand for further improvement.

SUMMARY

Provided are a hyper-branched polymer with excellent thermal resistance, an electrode for a fuel cell including the hyper-branched polymer, an electrolyte membrane for a fuel cell including the hyper-branched polymer, and a fuel cell having excellent cell voltage characteristics, the fuel cell including at least one of the electrode and the electrolyte membrane.

According to an aspect of the present invention, a hyper-branched polymer having a degree of branching in the range of about 0.05 to about 1 includes a dendritic unit represented by Formula 1, a linear unit represented by Formula 2, and a terminal unit represented by Formula 3.

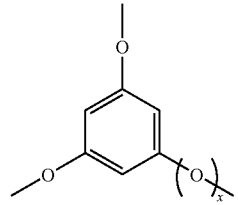

Formula 1

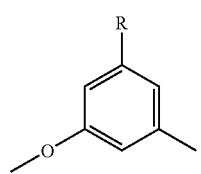

Formula 2

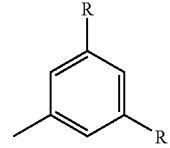

Formula 3 wherein x is 0 or 1, and each R is independently fluorine, a $C_1$-$C_{20}$ fluorinated alkyl group, a $C_6$-$C_{20}$ fluorinated aryl group, a $C_2$-$C_{20}$ fluorinated heteroaryl group, a $C_6$-$C_{20}$ fluorinated cycloalkyl group, or a $C_2$-$C_{20}$ fluorinated heterocyclic group.

According to another aspect of the present invention, there is provided a cross-linked material of the hyper-branched polymer described above, the cross-linked material being a product of cross-linking reaction between the hyper-branched polymer and a benzoxazine-based monomer.

According to another aspect of the present invention, there is provided a cross-linked material of the hyper-branched polymer described above, the cross-linked material being a product of cross-linking reaction between the hyper-branched polymer, a benzoxazine-based monomer, and a cross-linkable compound.

According to another aspect of the present invention, a hyper-branched polymer mixture includes the hyper-branched polymer; and a benzoxazine-based monomer.

According to another aspect of the present invention, there is provided an electrode for a fuel cell, the electrode including the hyper-branched polymer described above, the cross-linked material described above or the hyper-branched polymer mixture above.

According to another aspect of the present invention, there is provided an electrolyte membrane for a fuel cell, the electrolyte membrane including the hyper-branched polymer described above or the cross-linked material described above.

According to another aspect of the present invention, a fuel cell includes: a cathode; an anode; and an electrolyte membrane disposed between the cathode and the anode, wherein at least one of the cathode, the anode, and the electrolyte membrane includes the hyper-branched polymer described above or the cross-linked material of the hyper-branched polymer described above. Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 10 is a schematic sectional view of an exemplary membrane electrode assembly (MEA) in the fuel cell of FIG. 9;

DETAILED DESCRIPTION

Figure 1A:
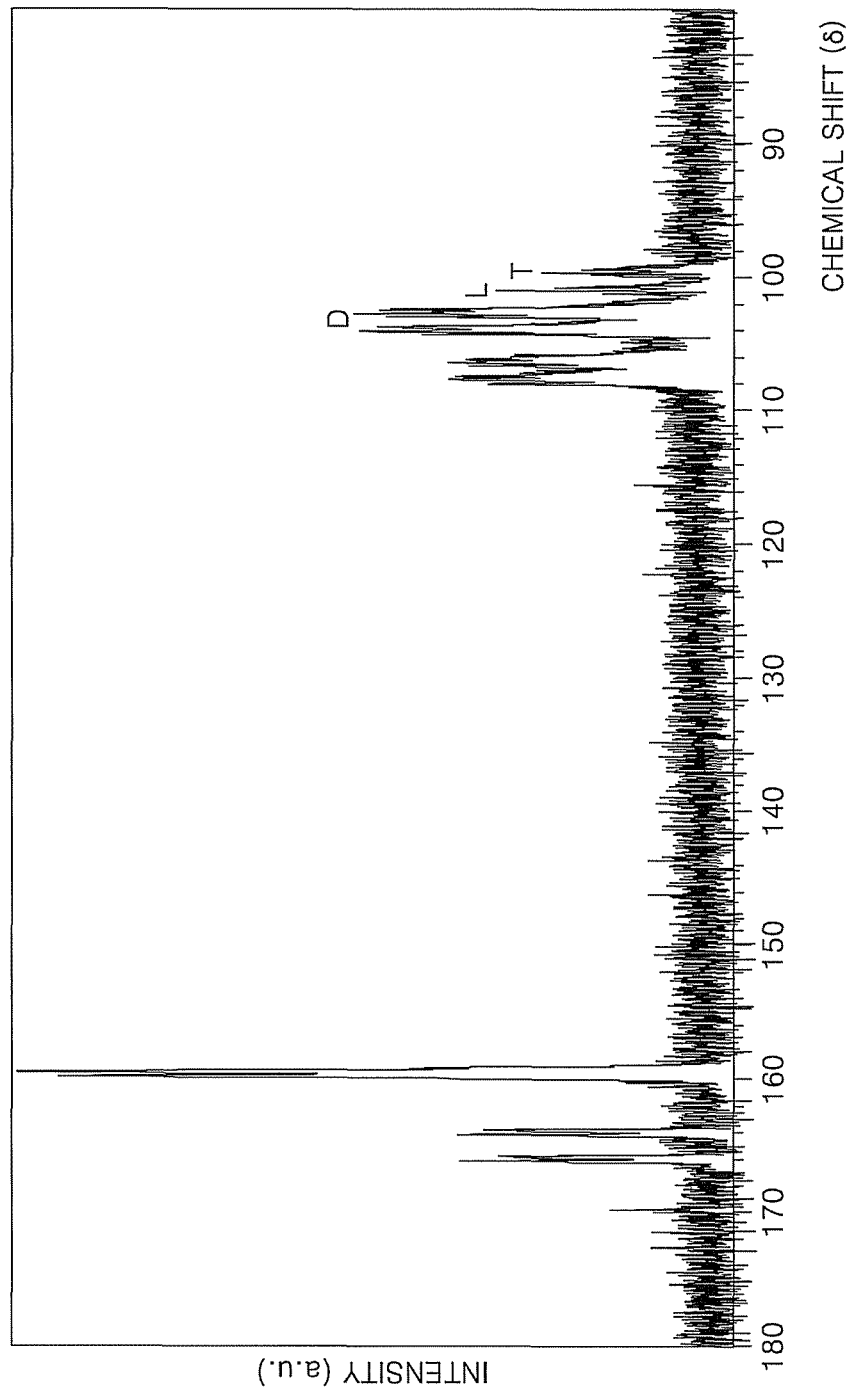
FIG. 1A is a $^{13}$C-nuclear magnetic resonance (NMR) spectrum of HPE of Formula 6 obtained in Synthesis Example 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to an aspect of the present invention, a hyper-branched polymer having a degree of branching in the range of about 0.05 to about 1 includes a dendritic unit represented by Formula 1, a linear unit represented by Formula 2, and a terminal unit represented by Formula 3.

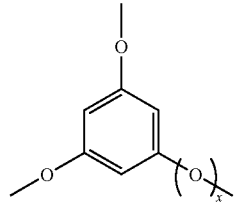

Formula 1

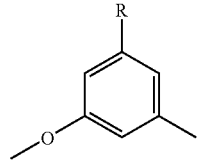

Formula 2

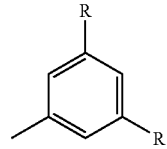

Formula 3 wherein x is 0 or 1, and each R is independently fluorine, a C1-C20 fluorinated alkyl group, a C6-C20 fluorinated aryl group, a C2-C20 fluorinated heteroaryl group, a C6-C20 fluorinated cycloalkyl group, or a C2-C20 fluorinated heterocyclic group.

The degree of branching represents a ratio of a total number of the dendritic units and terminal units to a total number of the dendritic units, linear units, and terminal units. For example, if the degree of branching is 0, it means that only the linear units are included. If the degree of branching is 1, it means that no linear units are included. According to aspects, the hyper-branched polymer has a degree of branching in the range of about 0.05 or greater to about 1. For example, the degree of branching of the hyper-branched polymer may be in the range of about 0.05 to about 0.9.

The degree of branching may be calculated based on a ratio of integral values for the peaks of the nuclear magnetic resonance (NMR) spectra of the dendritic units, linear units, and terminal units.

The hyper-branched polymer may be synthesized from a monomer in the form of AB$_2$ and may have the three types of repeating units, as described above, i.e., the dendritic units, linear units, and terminal units.

The hyper-branched polymer may have a number average molecular weight in the range of about 8,000 to about 15,000.

R, for example, may be fluorine, a trifluoromethyl group, a 3,5-difluorophenyl group, or one group selected from the groups represented by the following formulae:

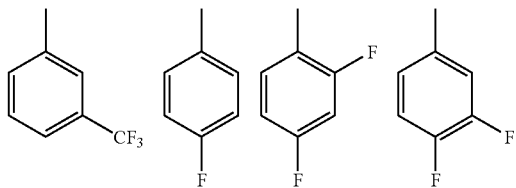

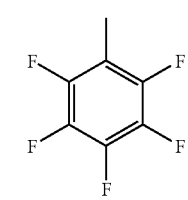

The hyper-branched polymer may include a core unit that links with the dendritic unit, the linear unit, and the terminal unit. The core unit may be represented by Formula 4.

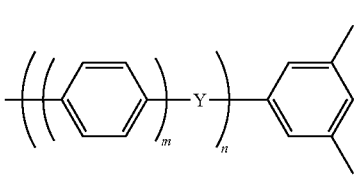

Formula 4 wherein Y is $-SO_2-$, $-C(CH_3)_2-$, $-C(CF_3)_2-$, $-N=N-$, or $-O-$; m is a number in the range of about 0 to about 3; and n is a number in the range of about 0 to about 1.

The core unit of Formula 4 may include a unit represented by the following formula:

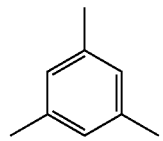

The hyper-branched polymer may include a compound represented by Formula 5 below.

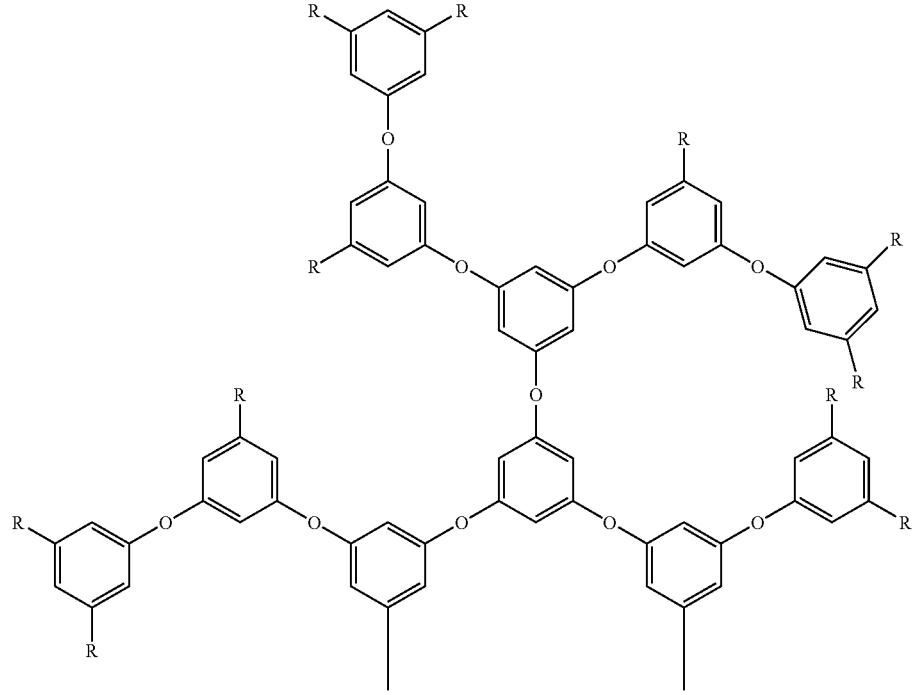

Formula 5

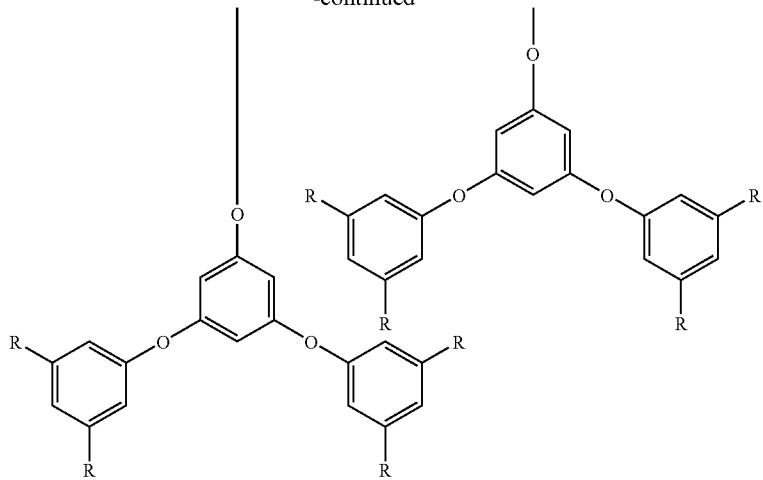

wherein R may be fluorine, a trifluoromethyl group, a 3,5-difluorophenyl group, or one group selected from the groups represented by the following formulae:

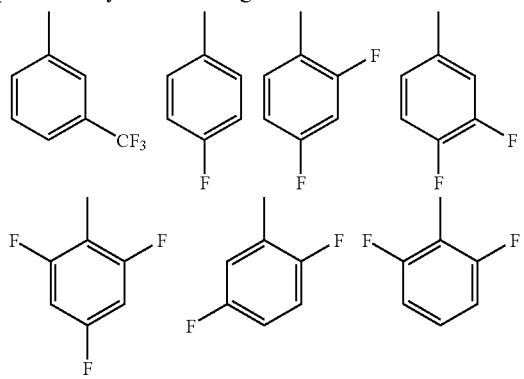

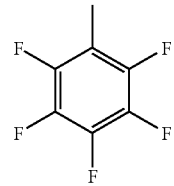

Examples of the compound of Formula 5 may include a compound represented by Formula 6 or 7.

The compound of Formula 7 contains more fluorine or fluorine functional groups than the compound of Formula 6, as shown below.

Formula 6

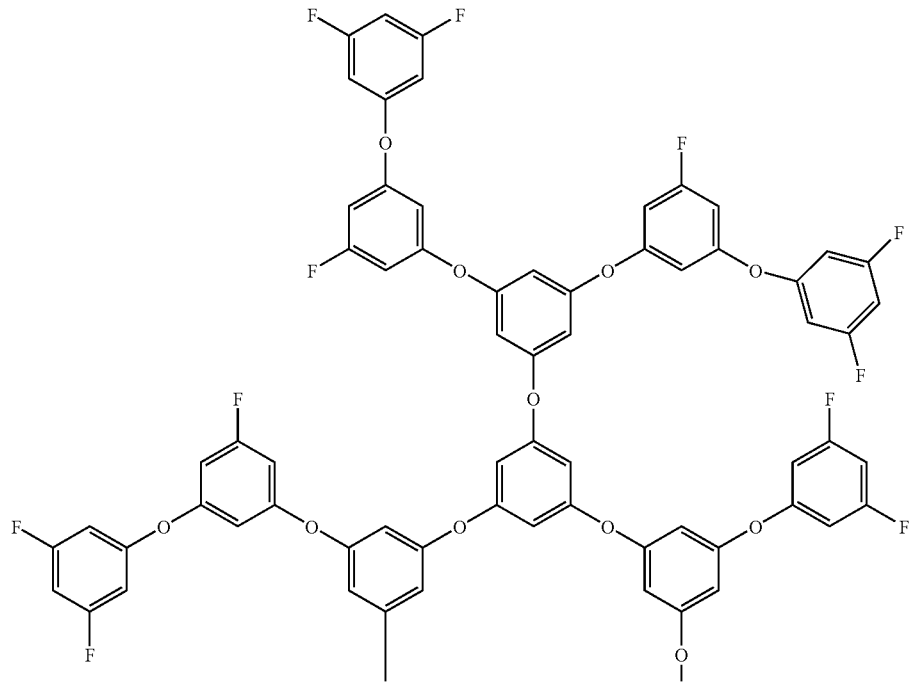

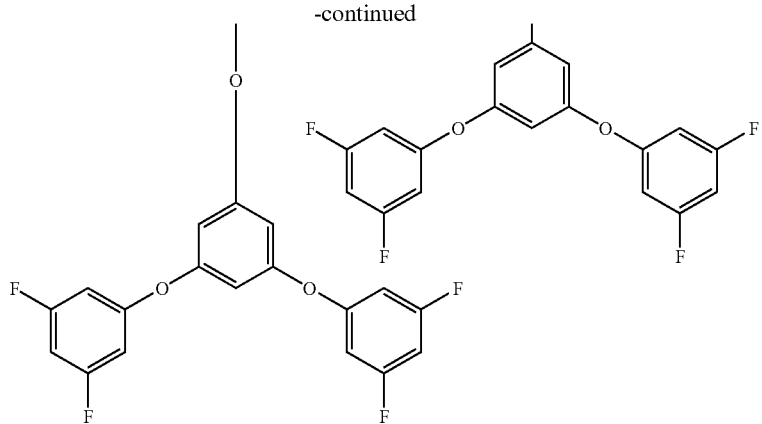
The compound of Formula 6 may, for example, have a degree of branching in the range of about 0.05 to about 0.9, or a degree of branching in the range of about 0.63 to about 0.9, and may have a number average molecular weight in the range of about 8,000 to about 12,000.
Formula 7
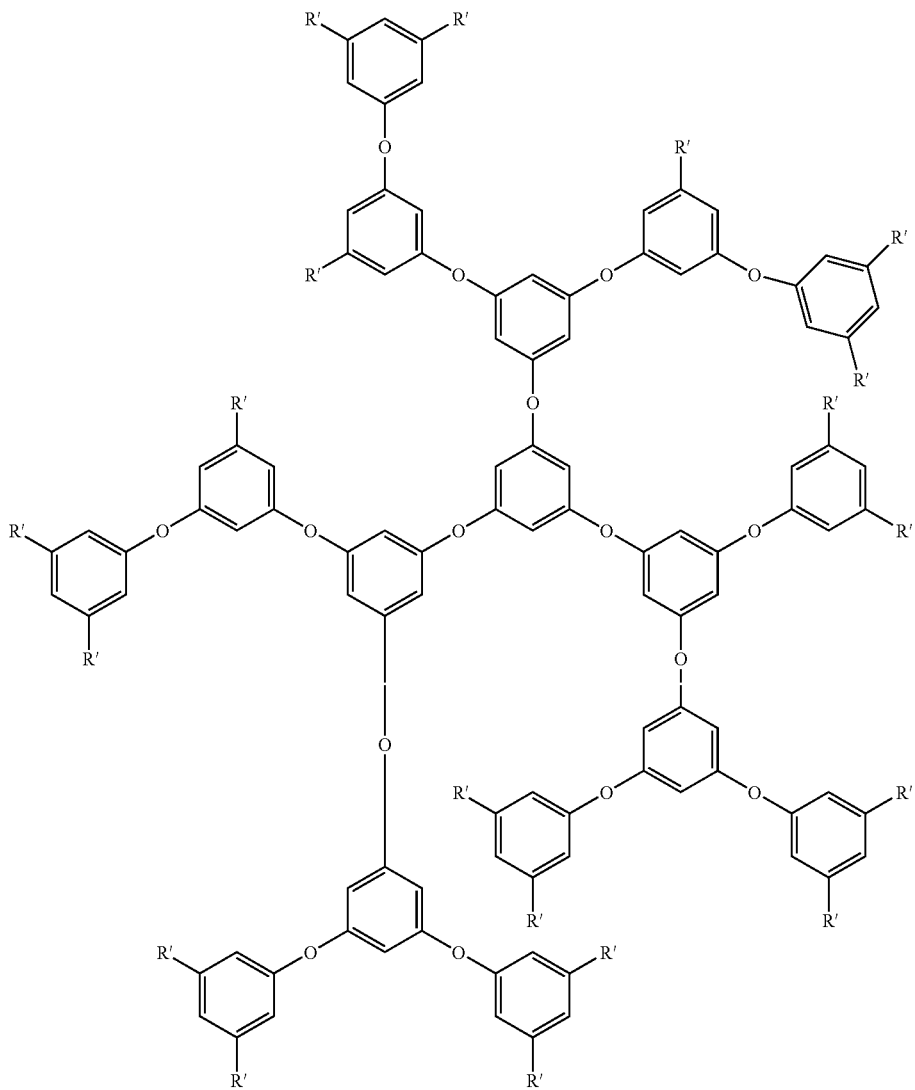

wherein R' is a pentafluorophenyl group. The compound of Formula 7 may, for example, have a degree of branching in the range of about 0.05 to about 0.9, or a degree of branching in the range of about 0.63 to about 0.9, and may have a number average molecular weight in the range of about 12,000 to about 15,000.

Hereinafter, a method of preparing the hyper-branched polymer will be described. A method of preparing the compound of Formula 6 and the compound of Formula 7 will be described as examples.

Initially, the compound of Formula 6, which is a AB2 type fluorinated polyester, may be synthesized by adding a solvent to 3,5-difluorophenol and reacting the mixture with a base for esterification.

The solvent may include toluene, dimethylacetamide, N-methylpyrrolidone (NMP), or the like. The amount of the solvent may be in the range in the range of about 500 to about 3,000 parts by weight based on 100 parts by weight of 3,5-difluorophenol. When the amount of the solvent is within this range, reactivity of the esterification may be excellent.

The base may include potassium carbonate ($K_2CO_3$), potassium hydroxide (KOH) or the like. The amount of the base may be in the range of about 1.5 moles to about 2 moles based on 1 mole of 3,5-difluorophenol.

The reaction temperature may be in the range of about 175° C. to about 205° C.

The hyper-branched polymer of Formula 6 prepared through the processes described above may have a degree of branching in the range of about 0.63 to about 0.9, and a number average molecular weight in the range of about 8,000 to about 12,000.

The compound of Formula 7 may be obtained through a one-spot reaction in which Suzuki coupling from the compound of Formula 5 as a starting material, which is obtained through the above-described processes with respect to Formula 6, a palladium catalyst, and trifluorophenylboronic acid occurs.

A solvent is added to the compound of Formula 5, and $Pd(PPh_3)_4$ (of which Ph=phenyl group), a base, and pentafluorophenylboronic acid are further added to the mixture and reacted at a temperature in the range of about 65° C. to about 80° C.

The base may include potassium carbonate ($K_2CO_3$), potassium hydroxide (KOH) or the like. The amount of the base may be in the range of about 0.65 moles to 0.8 moles based on 1 mole of the compound of Formula 5.

The hyper-branched polymer of Formula 7 prepared through the processes described above may have a degree of branching in the range of about 0.63 to about 0.9, and a number average molecular weight in the range of about 12,000 to about 15,000.

The degrees of branching and the number average molecular weights of the hyper-branched polymers of Formulae 6 and 7 may vary according to the type of reaction solvent, reaction time, and reaction temperature.

The hyper-branched polymer may be a single macro-molecule, may be easy to synthesize, and may be produced on a large scale. The hyper-branched polymer includes fluorine or a fluorine functional group, and thus, has a high affinity for oxygen, thereby improving the oxygen permeability thereof. In addition, the hyper-branched polymer has improved heat resistance, durability, and phosphoric acid retention characteristics.

According to another aspect of the present invention, there is provided a cross-linked material of the hyper-branched polymer.

According to another aspect of the present invention, there is provided a hyper-branched polymer mixture.

According to another aspect of the present invention, there is provided a cross-linked material of the hyper-branched polymer, a benzoxazine-based monomer, and a cross-linkable compound.

The cross-linkable compound may be at least one selected from the group consisting of polybenzimidazoles (PBI), polybenzthiazoles, polybenzoxazoles, polyimides, and combinations thereof.

Examples of polybenzimidazoles (PBI) may include compounds represented by the following formulae:

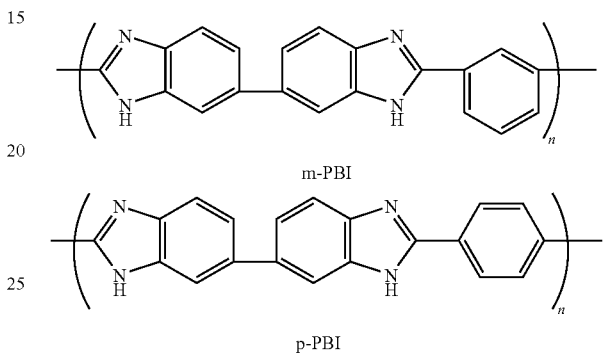

m-PBI p-PBI wherein n is an integer of 10 or greater, for example, an integer of 100 or greater. These polymeric compounds may have a number average molecular weight of 1,000,000 or less.

The amount of the cross-linkable compound may be in the range of about 5 parts to about 95 parts by weight, based on 100 parts by weight of the benzoxazine-based monomer.

The amount of the hyper-branched polymer may be in the range of about 0.1 parts to about 10 parts by weight, based on 100 parts by weight of the benzoxazine-based monomer.

When the amounts of the cross-linkable compound and the hyper-branched polymer are within these ranges, the final cross-linked material of the hyper-branched polymer may have excellent phosphoric acid retention capability.

The cross-linked material of the hyper-branched polymer may be prepared by thermally treating a mixture of the hyper-branched polymer and the benzoxazine-based monomer or a mixture of the hyper-branched polymer, the benzoxazine-based monomer, and the cross-linkable compound at a temperature in the range of about 50 to about 250° C., for example, at a temperature in the range of about 80 to about 220° C. Further, different hyper-branched polymers may be mixed and cross-linked by thermally treating a mixture of hyper-branched polymers and the benzoxazine-based monomer or a mixture of hyper-branched polymers, the benzoxazine-based monomer, and the cross-linkable compound at a temperature in the range of about 50 to about 250° C., for example, at a temperature in the range of about 80 to about 220° C.

When a mixture of the hyper-branched polymer and the benzoxazine-based monomer is used as a starting material, the benzoxane-based monomer is polymerized during the above-described thermal treatment to form a cross-linked material of the hyper-branched polymer with at least one of a polymer of the benzoxazine-based monomer and the benzoxazine-based monomer.

When a mixture of the hyper-branched polymer, the benzoxazine-based monomer, and the cross-linkable compound is used as a starting material, the benzoxane-based monomer is polymerized during the above-described thermal treatment, and at least one of a polymer of the benzoxazine-based monomer and the benzoxazine-based monomer is cross-linked with the cross-linkable compound and the hyper-branched polymer, and thus a cross-linked material thereof is obtained. During this process, a graft polymerization product of the hyper-branched polymer, the benzoxazine-based monomer, and the cross-linkable compound may be obtained.

However, aspects are not limited thereto such that the thermal treatment process may not be performed. For example, when at least one of an electrode and an electrolyte membrane are manufactured using a mixture of the hyper-branched polymer and the benzoxazine-based monomer or a mixture of the hyper-branched polymer, the benzoxazine-based monomer, and the cross-linkable compound, the mixture of the hyper-branched polymer and the benzoxazine-based monomer or the mixture of the hyper-branched polymer, the benzoxazine-based monomer, and the cross-linkable compound may be further cross-linked when the battery operates.

Examples of the benzoxazine-based monomer include compounds represented by Formulae 8 through 13, but are not limited thereto.

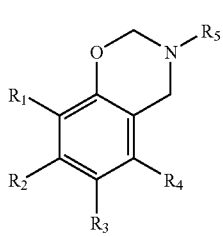

Formula 8

In Formula 8, $R_1$ through $R_4$ are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 cycloalkyl group, a substituted or unsubstituted C4-C20 cycloalkyloxy group, a substituted or unsubstituted C2-C20 heterocycle group, a halogen atom, a hydroxyl group, or a cyano group.

In Formula 8, $R_5$ is a halogenated C1-C20 alkyl group, a halogenated C1-C20 alkoxy group, a halogenated C2-C20 alkenyl group, a halogenated C2-C20 alkynyl group, a halogenated C6-C20 aryl group, a halogenated C6-C20 aryloxy group, a halogenated C7-C20 arylalkyl group, a halogenated C2-C20 heteroaryl group, a halogenated C2-C20 heteroaryloxy group, a halogenated C2-C20 heteroarylalkyl group, a halogenated C4-C20 carbocycle group, a halogenated C4-C20 carbocyclicalkyl group, a halogenated C2-C20 heterocycle group, or a halogenated C2-C20 heterocyclicalkyl group.

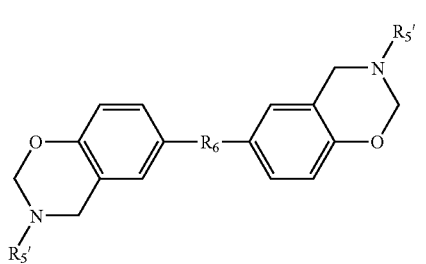

Formula 9

In Formula 9, $R_5'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group.

In Formula 9, R6 is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—.

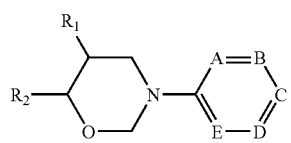

Formula 10

In Formula 10, A, B, C, D, and E are all carbon; or one or two of A, B, C, D, and E is nitrogen and the others are carbon.

In Formula 10, $R_1$ and $R_2$ are linked to each other to form a ring, wherein the ring is a C6-C10 cycloalkyl group, a C3-C10 heteroaryl group, a fused C3-C10 heteroaryl group, a C3-C10 heterocyclic group, or a fused C3-C10 heterocyclic group.

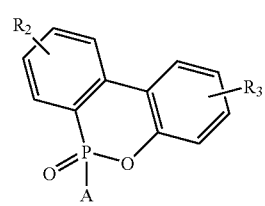

Formula 11

In Formula 11, A is a substituted or unsubstituted C1-C20 heterocyclic group, a substituted or unsubstituted C4-C20 cycloalkyl group, or a substituted or unsubstituted C1-C20 alkyl group.

In Formula 11, $R_2$ and $R_3$ are each independently hydrogen, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxyl group.

Formula 12

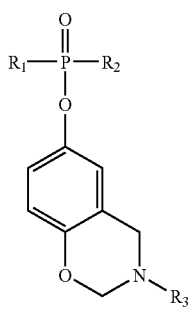

In Formula 12, R1 and R2 are each independently a C1-C20 alkyl group, a C1-C20 alkoxy group, a C6-C20 aryl group, a C6-C20 aryloxy group, or a group represented by the formula below,

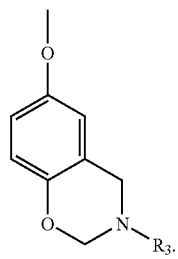

In this Formula, $R_3$ is one a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group.

Formula 13

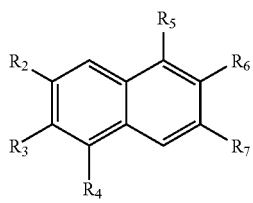

In Formula 13, $R_2$ and $R_3$, or $R_3$ and $R_4$ are linked to each other to form a compound represented by Formula 2A below; and/or $R_5$ and $R_6$ or $R_6$ and $R_7$ are linked to each other to form the compound of Formula 2A below:

Formula 2A

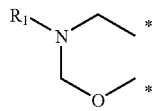

In Formula 2A, $R_1$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and * denotes the positions in which $R_2$ and $R_3$, $R_3$ and $R_4$, $R_5$ and $R_6$, and/or $R_6$ and $R_7$ in Formula 13 above are linked to each other.

$R_1$ of Formula 2A may be selected from the groups represented by the following formulae.

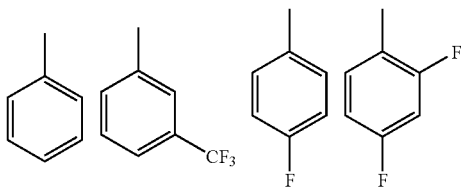

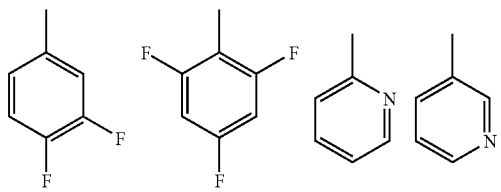

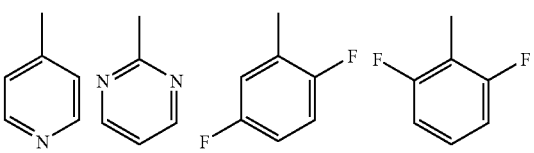

Examples of the benzoxazine-based monomer of Formula 8 may include compounds represented by the following formulae.

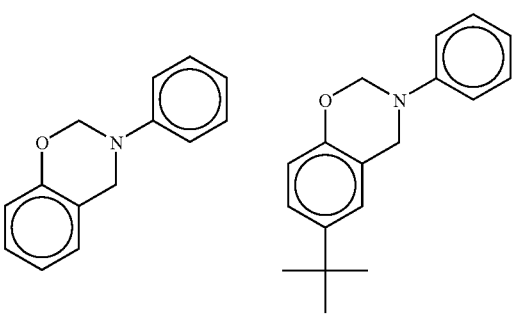

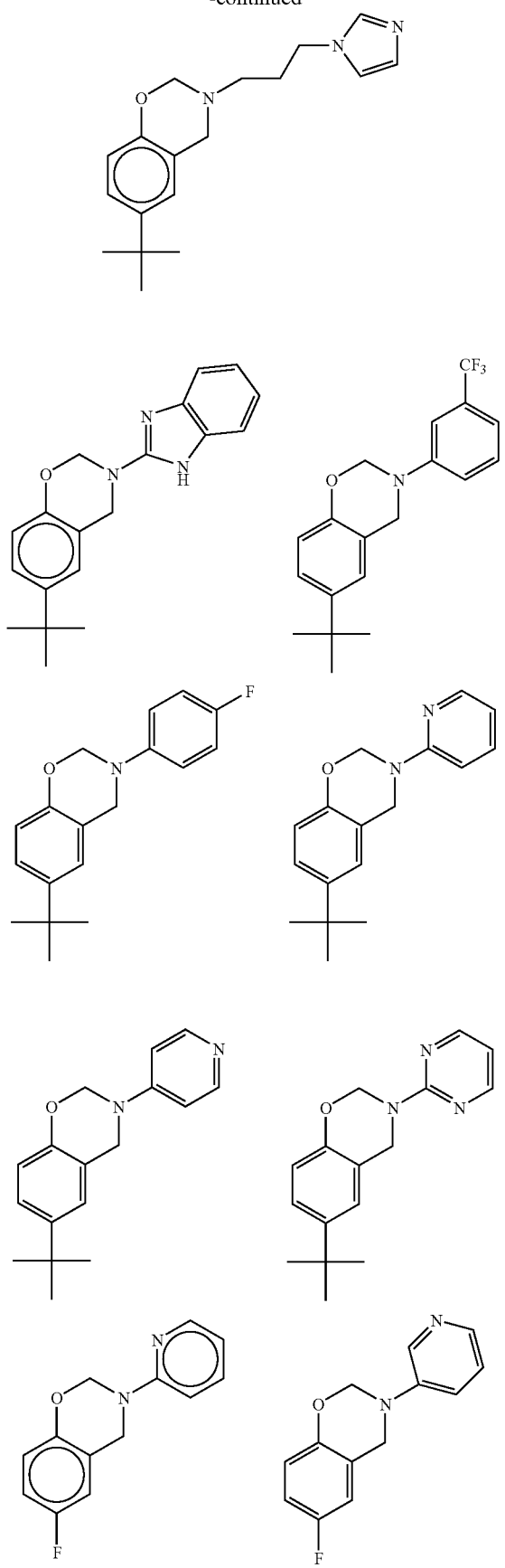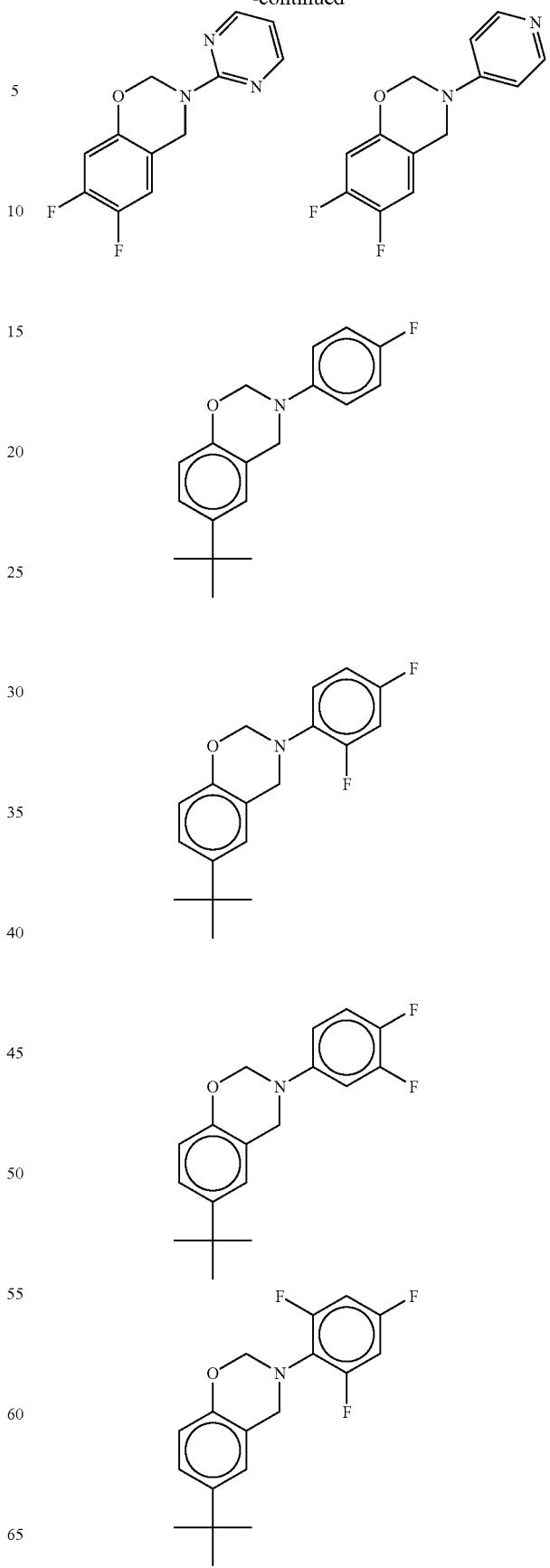

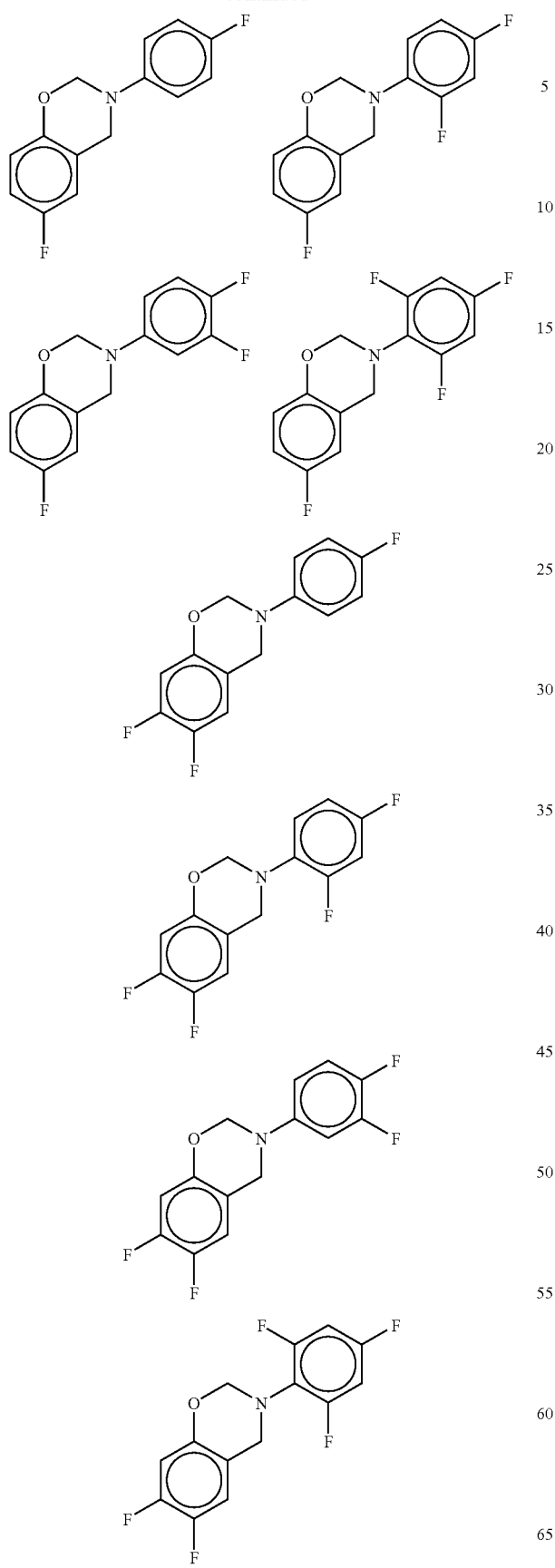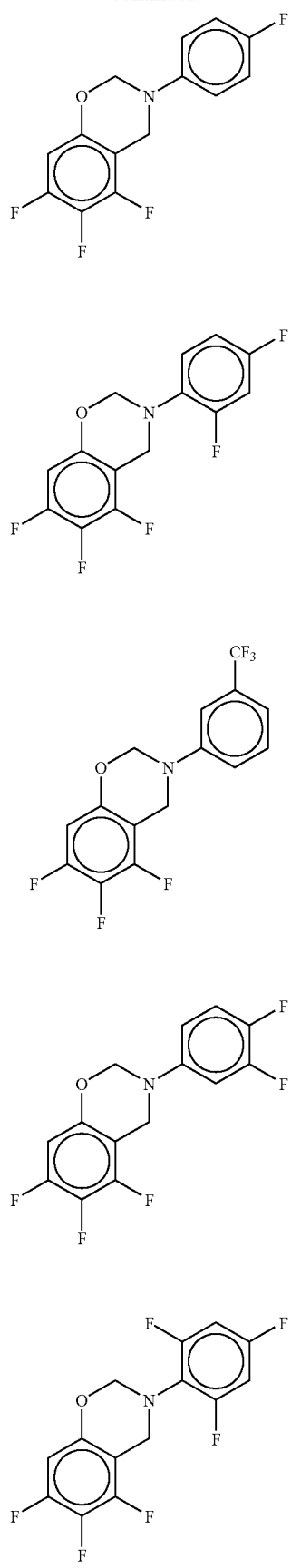

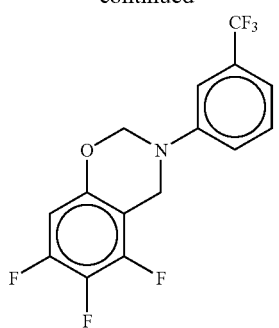
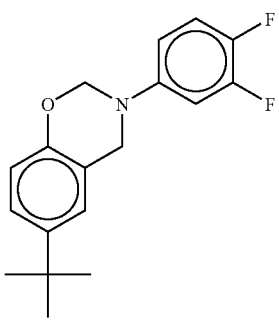
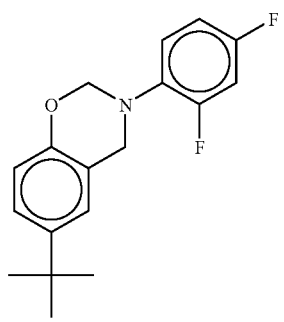
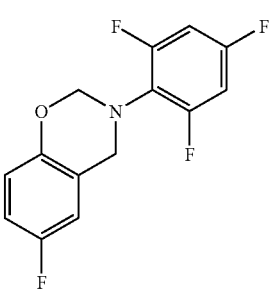
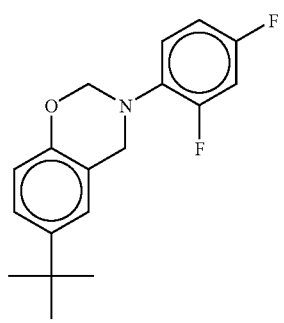
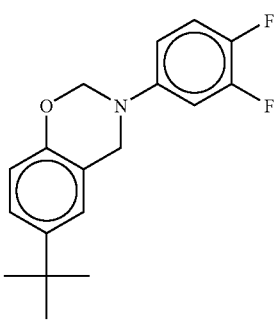
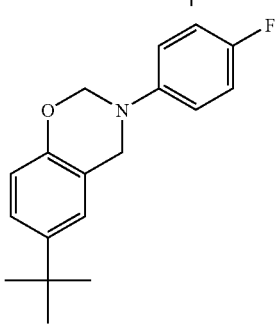
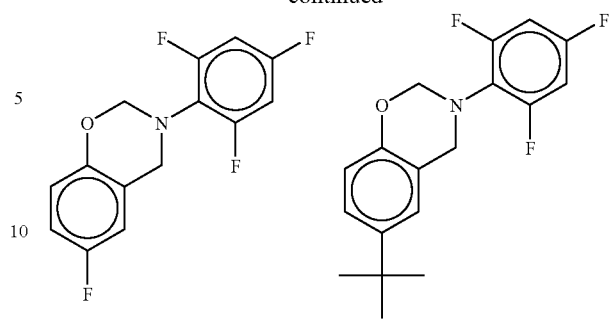
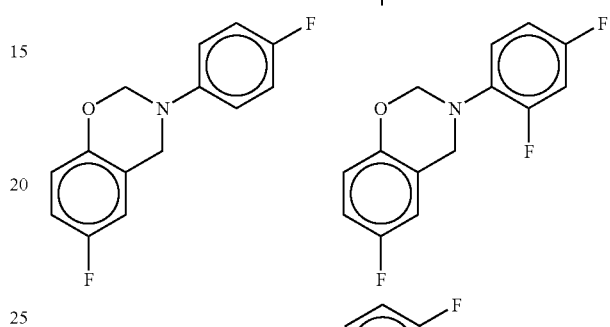
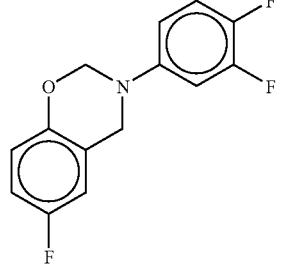
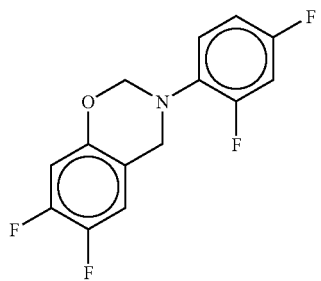
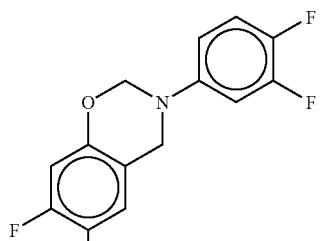
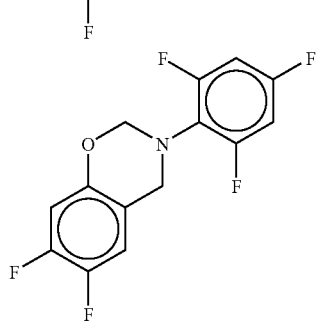

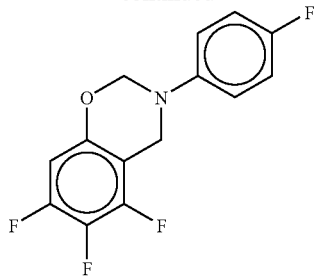

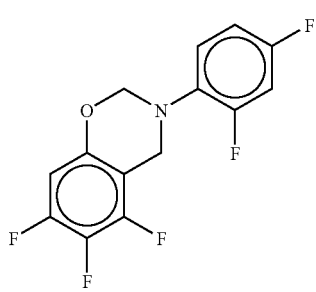

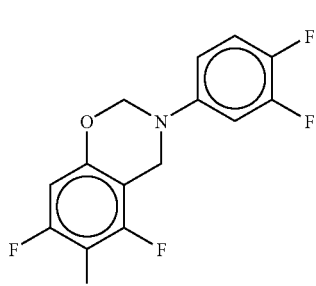

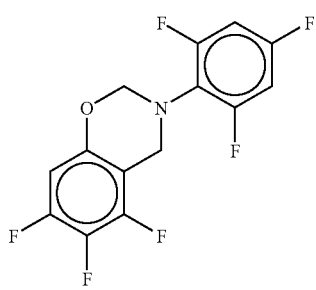

Examples of the benzoxazine-based monomer of Formula 9 may include compounds represented by the following formulae.

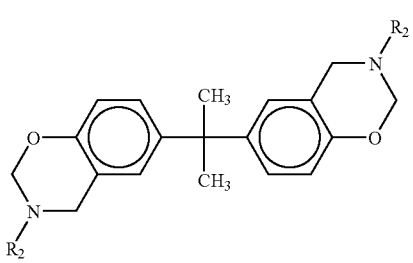

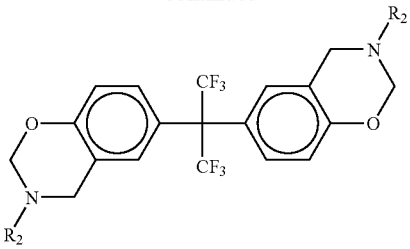

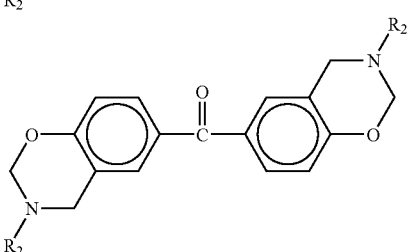

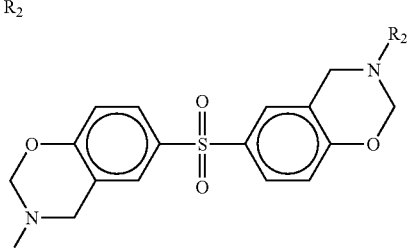

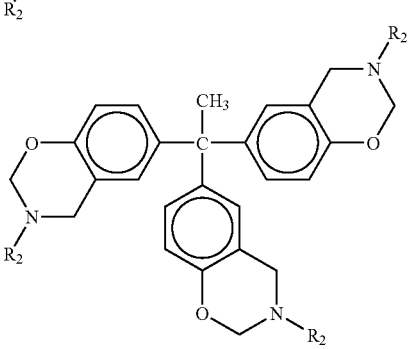

In the representative examples of Formula 9 above, $R_2$ may be a phenyl group, —$CH_2$—CH=$CH_2$, or one of the groups represented by the following formulae:

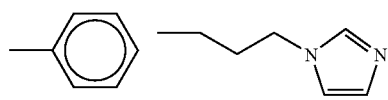

For example, examples of the benzoxazine-based monomer of Formula 9 may include compounds represented by the following formulae.

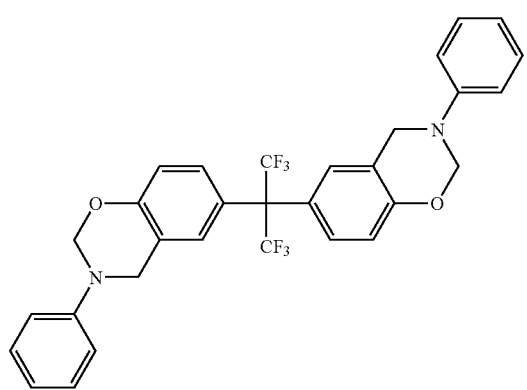
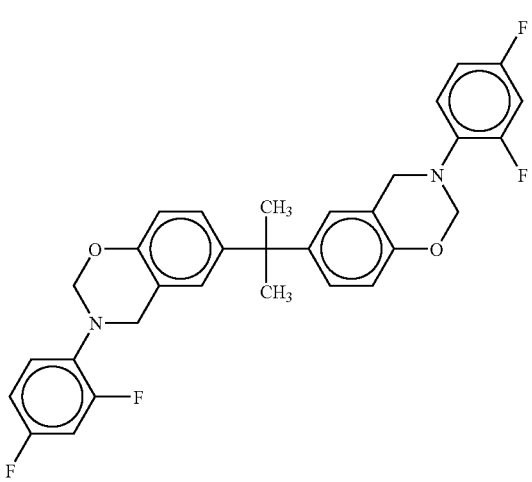
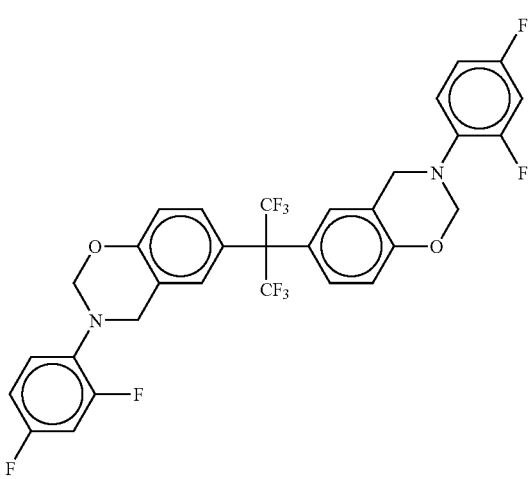
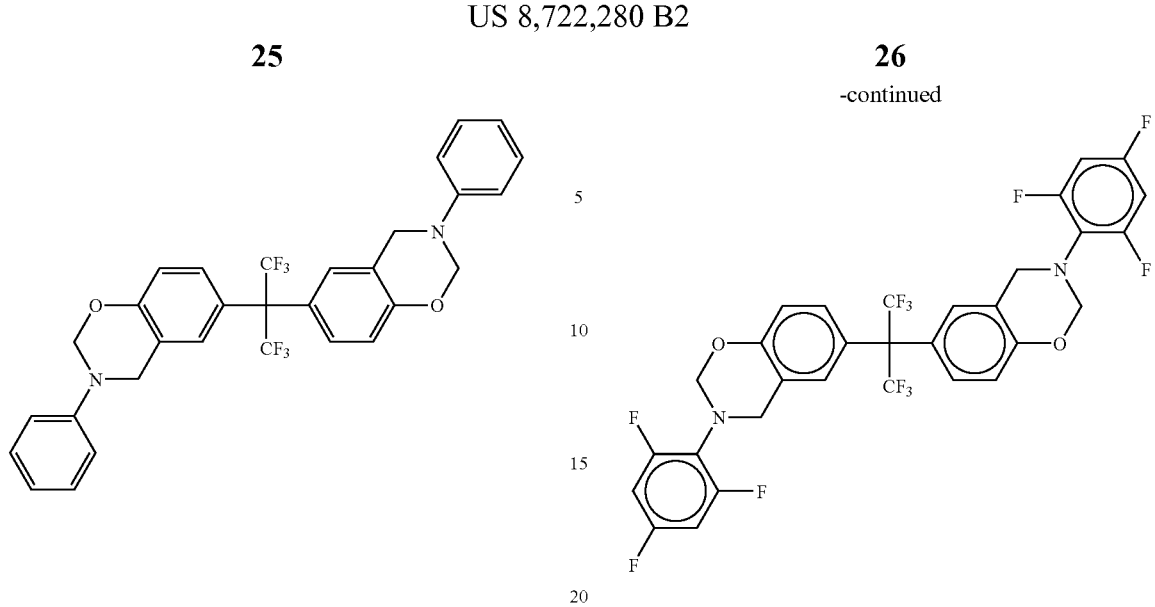
Examples of the benzoxazine-based monomer of Formula 10 may include compounds represented by the following formulae:
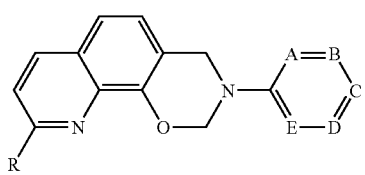
wherein R is a hydrogen atom or a C1-C10 alkyl group, and
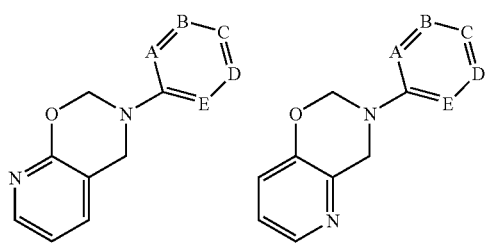
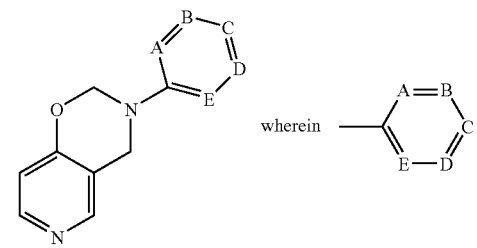
wherein 
is selected from the groups represented by the following formulae:
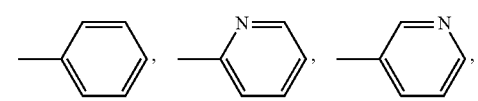

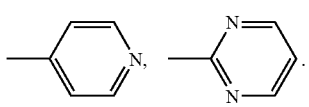
Examples of the benzoxazine-based monomer of Formula 10 include compounds represented by the following formulae:
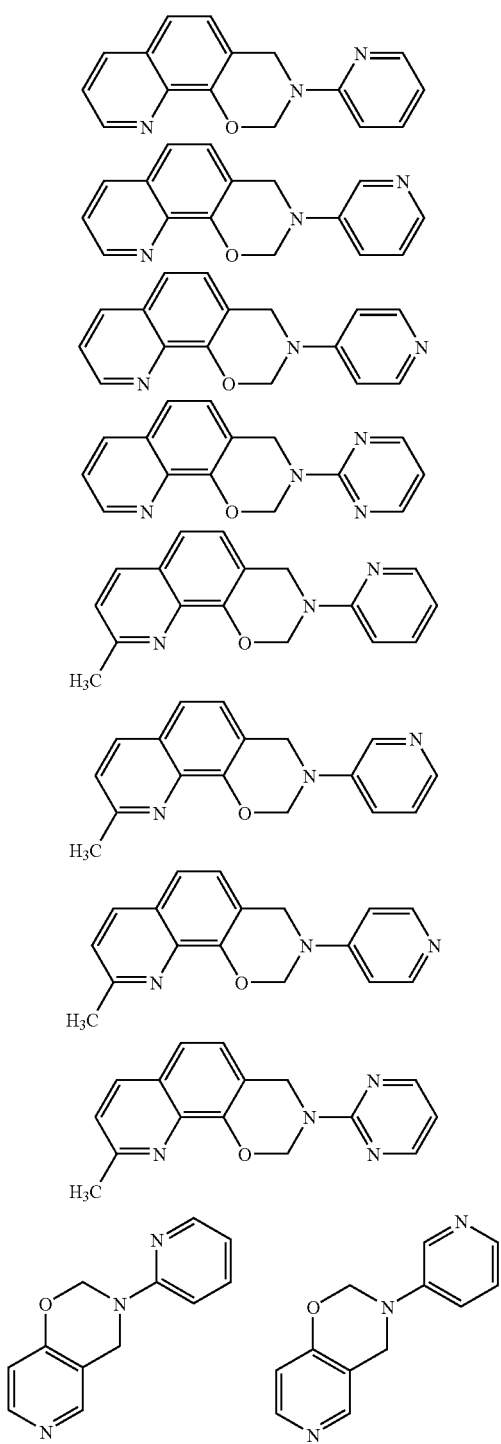
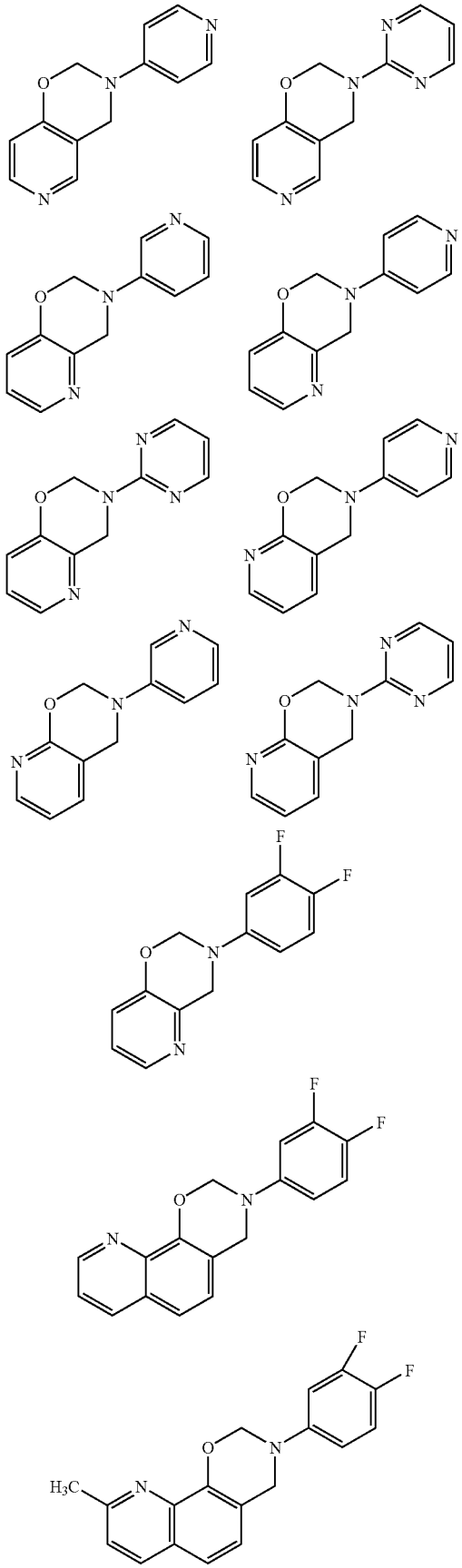

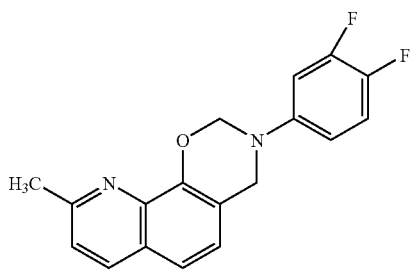

Examples of the benzoxazine-based monomer of Formula 11 include compounds in which A may be selected from the groups represented by the following formulae:

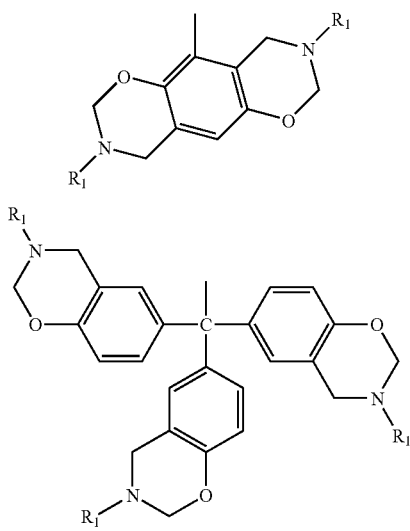

wherein $R_1$ is a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group or a halogenated C1-C20 heterocyclic group.

Examples of a benzoxazine-based monomer containing phosphorous represented by Formula 11 above include compounds represented by the following formulae:

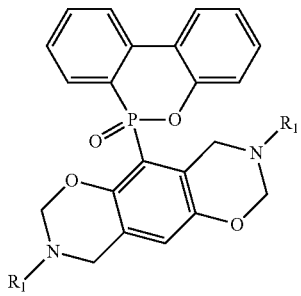

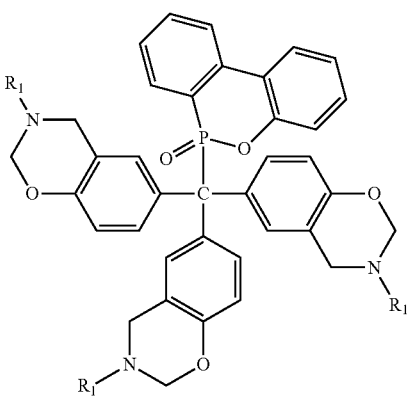

wherein R1 is selected from the groups represented by the following formulae:

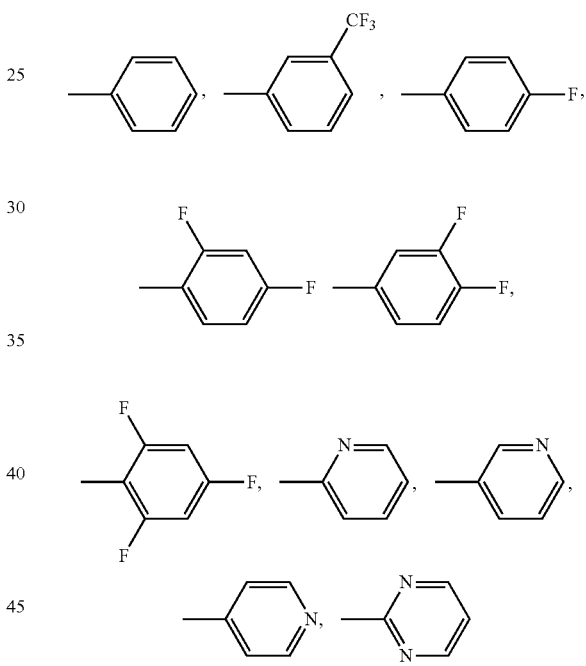

The compound of Formula 11 above may be selected from the compounds represented by the following formulae:

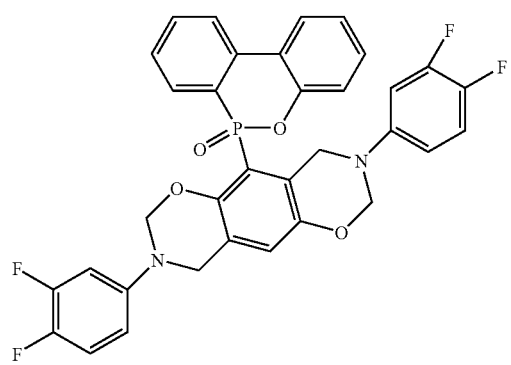

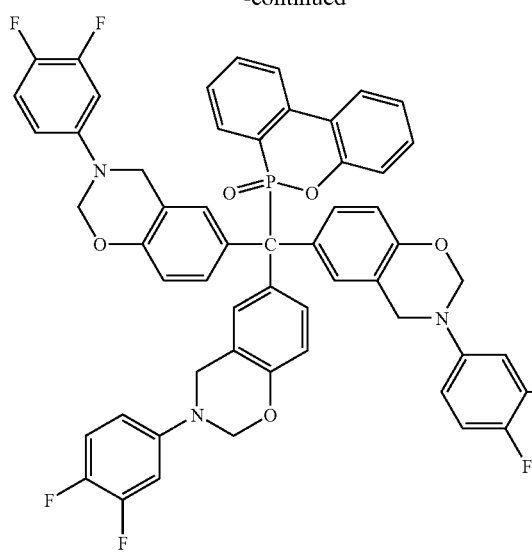
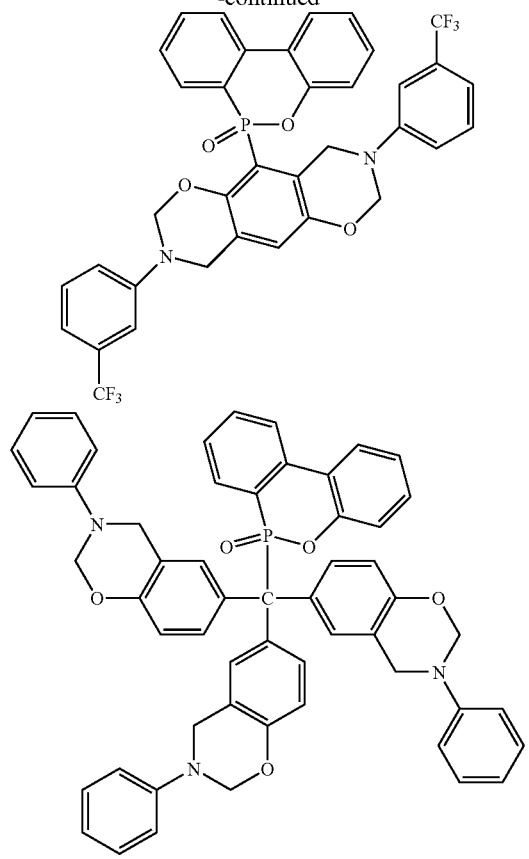
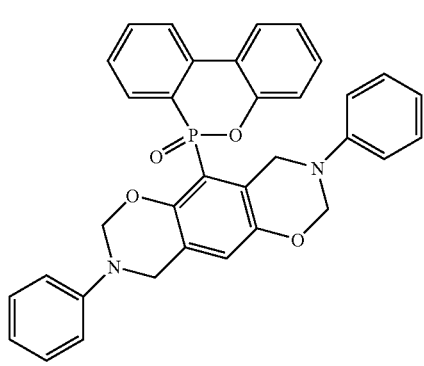
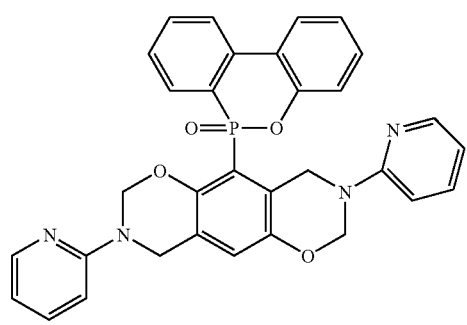
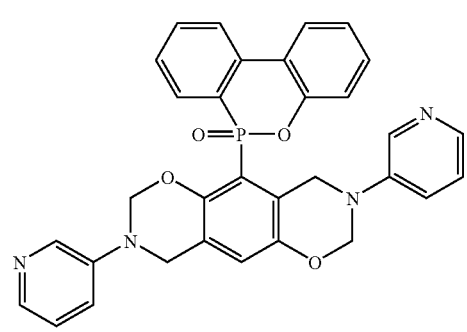
Examples of the benzoxazine-based monomer of Formula 12 include compounds represented by the following formulae:
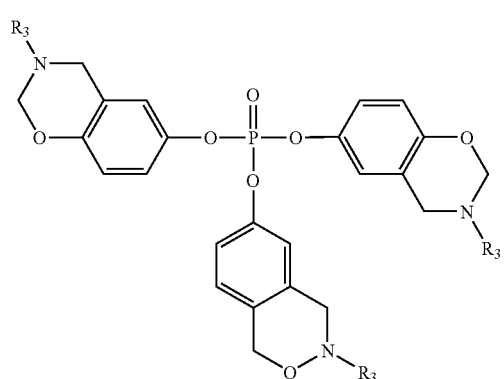
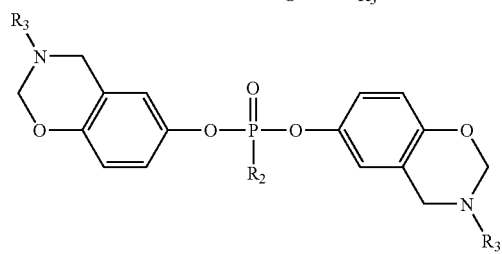
wherein $R_2$ is a C1-C10 alkyl group, a C1-C10 alkoxy group, a C6-C10 aryl group, or a C6-C10 aryloxy group,

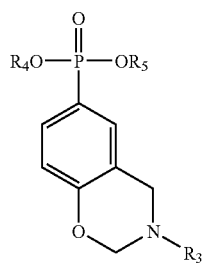

wherein $R_4$ and $R_5$ are each independently a C6-C10 aryl group, and $R_3$ is selected from the groups represented by the following formulae:

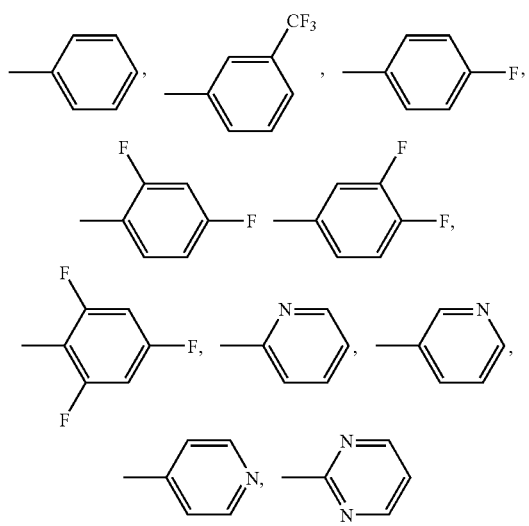

The compound of Formula 12 above may be selected from the compounds represented by the following formulae:

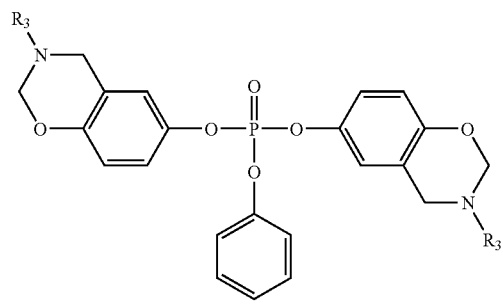

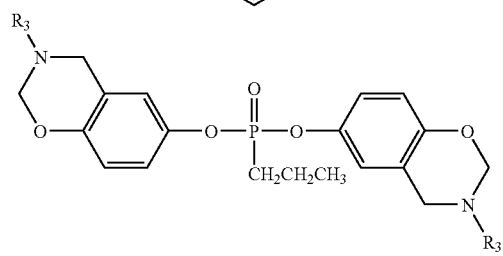

wherein $R_3$ is selected from the groups represented by the following formulae:

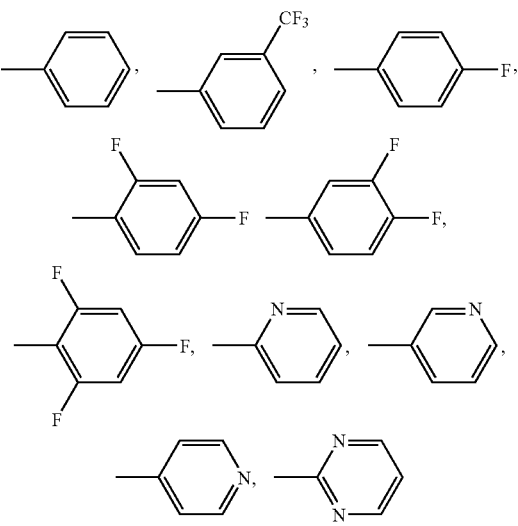

Examples of the benzoxazine-based monomer of Formula 13 may include compounds represented by the following formulae:

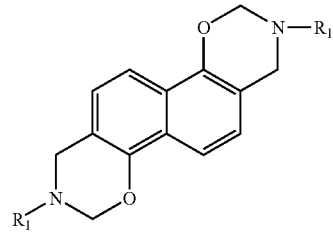

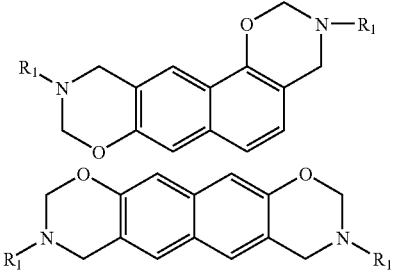

wherein $R_1$ is selected from the groups represented by the following formulae:

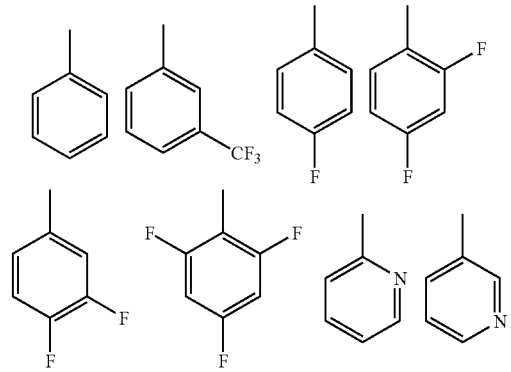

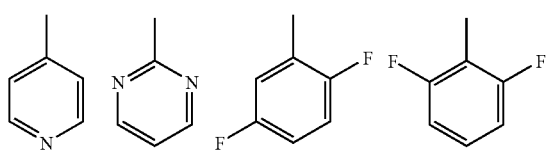

Examples of the benzoxazine-based monomer of Formula 13 may further include compounds represented by the following formulae:

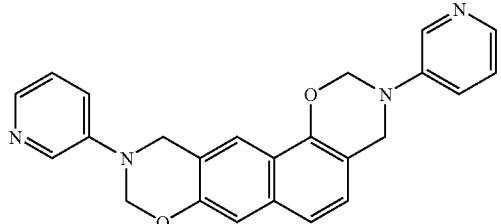

According to another aspect of the present invention, an electrode for fuel cells includes a hyper-branched polymer having a dendritic unit represented by Formula 1, a linear unit represented by Formula 2, and a terminal unit represented by Formula 3, and/or a cross-linked material of the hyper-branched polymer. A core unit of the hyper-branched polymer may be represented by Formula 4.

The electrode includes a catalyst layer including one selected from the hyper-branched polymer a cross-linked material of the hyper-branched polymer, and the hyper-branched polymer mixture and a catalyst. A core unit of the hyper-branched polymer may be represented by Formula 4.

The hyper-branched polymer, the cross-linked material of the hyper-branched polymer or and the hyper-branched polymer mixture may function as a binder, and thus may be an electrode without a common binder. In addition, the hyper-branched polymer or the cross-linked material of the hyper-branched polymer may improve the performance of the electrode, while including a smaller loading amount of the catalyst in the catalyst layer, as compared to general electrodes.

The electrode has improved oxygen permeability and a reduced activation time. In addition, the electrode has excellent heat resistance and phosphoric acid resistance, which make it easier for the electrode to be wet with a doped phosphoric acid.

Thus, a fuel cell, including the electrode described above, may operate in high-temperature, non-humidified conditions, and may provide improved thermal stability and power generation.

The amount of the hyper-branched polymer or the cross-lined material of the hyper-branched polymer in the electrode may be in the range of about 0.001 parts to about 0.65 parts by weight, or about 0.01 parts to about 0.05 parts by weight, based on 1 part by weight of the catalyst. When the amount of the hyper-branched polymer or the cross-linked material of the hyper-branched polymer is within these ranges, the wettability of the electrode and the oxygen permeability are improved.

The catalyst may be platinum (Pt), an alloy or a mixture of platinum (Pt) and at least one metal selected from the group consisting of gold (Au), palladium (Pd), rhodium (Rh), iridium (Ir), ruthenium (Ru), tin (Sn), molybdenum (Mo), cobalt (Co), chromium (Cr), and combinations thereof. The Pt, the alloy, or the mixture may be supported on a carbonaceous support. For example, the catalyst may be at least one catalyst selected from the group consisting of Pt, a PtCo alloy, and a PtRu alloy. Such a catalyst may be supported on a carbonaceous support.

The electrode may further include a binder commonly used in the manufacture of an electrode for a fuel cell. The binder may be at least one selected from the group consisting of poly(vinylidenefluoride), polytetrafluoroethylene (PTFE), tetrafluoroethylene-hexafluoroethylene copolymer, fluorinated ethylene propylene (FEP), styrene butadiene rubber (SBR), polyurethane, a mixture thereof, or the like. When polyurethane is used as the binder, it may lead to excellent cell voltage characteristics.

The amount of the binder may be in the range of about 0.001 parts to about 0.5 parts by weight, based on 1 part by weight of the catalyst. When the amount of the binder is within these ranges, the wetability of the electrode may be improved.

A method of manufacturing an electrode for fuel cells, according to an embodiment, is as follows. First, a catalyst is dispersed in a solvent to obtain a dispersion solution. The solvent may include N-methylpyrolidone (NMP), dimethylformamide (DMFA), or the like. The amount of the solvent may be in the range of about 1 part to about 10 parts by weight based on 1 part by weight of the catalyst.

The hyper-branched polymer, for example, the hyper-branched polymer of Formulae 6 or 7, may be added to, mixed with the dispersion solution, and stirred.

When an electrode including a cross-linked material of the hyper-branched polymer is manufactured, the benzoxazine-based monomer, or both the benzoxazine-based monomer and the crosslinkable compound may be further added to the mixture of the hyper-branched polymer with the dispersion solution.

The solvent may include N-methylpyrolidone (NMP), dimethylacetamide (DMAc), or the like.

The resultant mixture is coated on the surface of a carbon support to complete the manufacture of the electrode. Herein, the carbon support may be fixed on a glass substrate to facilitate the coating. The coating method is not particularly limited. Examples of the coating method may include coating using a doctor blade, bar coating, screen printing, and the like.

The coated resultant is dried at a temperature in the range of about 20 to about 150° C., to remove the solvent. The drying time may vary according to the drying temperature and may be in the range of about 10 to about 60 minutes.

When an electrode including a cross-linked material of the hyper-branched polymer is manufactured, a thermal treatment may be further performed at about 50 to about 250° C. after the coated mixture is dried. However, aspects of the invention are not limited thereto as described above.

The catalyst layer of the electrode may further include at least one proton conductor selected from a phosphoric acid and a C1-C20 organic phosphonic acid. The amount of the proton conductor may be in the range of about 10 parts to about 1,000 parts by weight, based on 100 parts by weight of the total weight of the electrode. The concentration of the acid is not particularly limited. However, when using a phosphoric acid, an 85 wt % phosphoric acid solution may be used. The impregnation time of the phosphoric acid may be from about 2.5 to about 14 hours at about 80° C.

Examples of the C1-C20 organic phosphonic acid include methyl phosphonic acid, and ethyl phosphonic acid.

According to another embodiment of the present invention, there is provided an electrolyte membrane for a fuel cell, the electrolyte membrane including the hyper-branched polymer, a cross-linked material of the hyper-branched polymer or the hyper-branched polymer mixture.

The electrolyte membrane reduces problems caused when an electrolyte membrane formed of polybenzimidazole alone is used, such as a pin-hole phenomenon caused by mechanical and chemical instability at high temperatures. In addition, the oxygen permeability of the electrolyte membrane according to aspects is increased, and the amount of dissolved oxygen in the electrolyte membrane according to aspects is increased, thereby reducing the activation time of the electrolyte membrane according to aspects.

Hereinafter, an electrolyte membrane including the hyper-branched polymer and a method of preparing the electrolyte membrane according to an embodiment of the present invention will be described. Initially, the electrolyte membrane including the hyper-branched polymer may be prepared in the same manner as preparing an electrolyte membrane including polybenzimidazole (PBI), except that the hyper-branched polymer is used instead of PBI.

A method of preparing an electrolyte membrane including a cross-linked material of the hyper-branched polymer is as follows. In order to prepare the electrolyte membrane, the hyper-branched polymer described above and a benzoxazine-based monomer, or the hyper-branched polymer, a benzoxazine-based monomer, and a cross-linkable compound are blended and then cured at about 50° C. to about 250° C., for example, at about 80° C. to about 220° C. Subsequently, the resultant is impregnated with a proton conductor, such as an acid, to form the electrolyte membrane.

The kind and amount of the cross-linkable compound, and the amount of the hyper-branched polymer are the same as described above.

A tape coating method or a common coating method may be used to form the electrolyte membrane. An example of the common coating method may include a method of casting the mixture on a support using a doctor blade. Herein, a doctor blade with a 250 to 500 μm gap may be used.

When the casting method using a doctor blade is used, the method of preparing the electrolyte membrane may further include separating the electrolyte membrane from the support, after curing and before impregnating with an acid. When separating the electrolyte membrane from the support, the mixture is immersed in distilled water at a temperature range of about 60 to about 80° C.

The support may be any suitable support for the electrolyte membrane, for example, a glass substrate, a polyimide film, and the like. When the tape casting method is used, a tape-cast membrane is separated from a support, such as polyethyleneterephthalate, before being cured, and is then put into an oven for curing. Thus, the process of removing the support after curing is unnecessary.

In addition, when the electrolyte membrane is formed of a mixture of the hyper-branched polymer and the benzoxazine-based monomer, or a mixture of the hyper-branched polymer, the benzoxazine-based monomer, and the cross-linkable compound by using a tape casting method, a process of filtering the mixture may be further performed.

The tape-cast membrane is thermally treated to induce a curing reaction, and then impregnated with a proton conductor, such as an acid, to complete the formation of the electrolyte membrane.

A method of manufacturing a membrane-electrode assembly (MEA) for a fuel cell, according to an embodiment, is as follows. The term "membrane-electrode assembly" refers to a structure in which an electrolyte membrane is disposed between two electrodes. Each of the electrodes may include a catalyst layer and a diffusion layer.

The MEA may be formed by positioning the electrodes, which include respective catalyst layers, on opposite sides of the electrolyte membrane, joining them all together at a high temperature and high pressure, and then joining a diffusion layer (i.e., a fuel diffusion layer) to each of the catalyst layers.

For example, the electrolyte membrane may be a polybenzimidazole electrolyte membrane, a polybenzoxazine-polybenzimidazole copolymer electrolyte membrane, or a porous polytetrafluoroethylene (PTFE) membrane. Alternatively, an electrolyte membrane including the hyperbranched polymer described above or the cross-linked material of the hyper-branched polymer may be used.

When the electrolyte membrane including the hyper-branched polymer described above or a cross-linked material of the hyper-branched polymer is used, and the triple-phase interface is formed of the same material, compatibility of the triple phases is improved. As a result, the contact resistance decreases and maximum performance of the fuel cell is attained.

The joining may be performed under a pressure in the range of about 0.1 to about 3 ton/cm$^2$, or about 1 ton/cm$^2$, at a temperature at which the electrolyte membrane is softened.

Next, bipolar plates are respectively installed on both sides of the MEA to complete the fuel cell. The bipolar plates may have grooves for supplying fuel and may be current collectors. The use of the fuel cell is not particularly limited. However, the fuel cell may be used as a polymer electrolyte membrane fuel cell (PEMFC).

Figure 9:
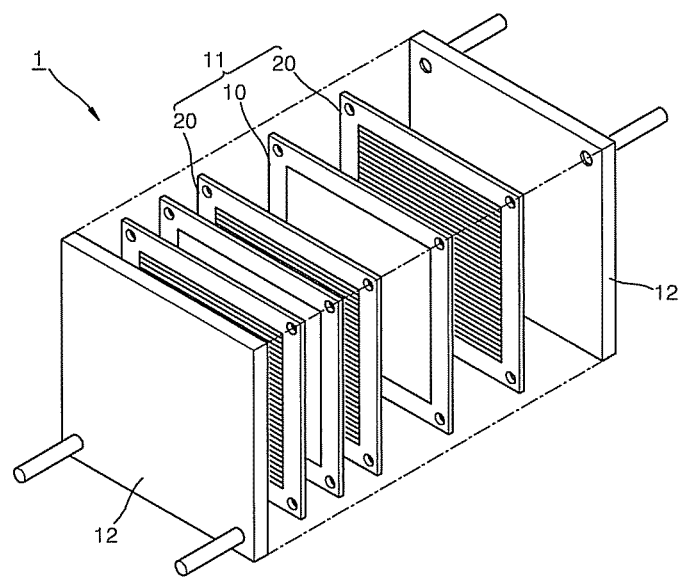
FIG. 9 is an exploded perspective view of an exemplary fuel cell.

Hereinafter, an exemplary a fuel cell will be described in detail. FIG. 9 is an exploded perspective view of an exemplary fuel cell and FIG. 10 is a schematic sectional view of an exemplary membrane electrode assembly (MEA) included in the fuel cell of FIG. 9.

Referring to FIG. 9, the fuel cell 1 according to the present embodiment includes two unit cells 11 which are supported by a pair of holders or end plates 12. Each unit cell 11 includes a MEA 10 and a pair of bipolar plates 20 which are respectively disposed on opposite sides of the MEA 10 (in a thickness direction). The bipolar plates 20 may be formed of a conductive material, such as a metal or carbon, and are assembled with the MEA 10. Thus, the bipolar plates 20 are current collectors and supply oxygen and fuel to catalyst layers of the MEA 10. In addition, the fuel cell 1 illustrated in FIG. 9 has two unit cells 11, but the number of the unit cells 11 is not limited thereto and may be up to several tens to hundreds according to the characteristics of the fuel cell 1.

Referring to FIG. 10, the MEA 10 includes an electrolyte membrane for a fuel cell 100, catalyst layers 110 and 110' respectively disposed on opposite sides of the electrolyte membrane 100 in the thickness direction, first gas diffusion layers 121 and 121' respectively formed on the catalyst layers 110 and 110', and second gas diffusion layers 120 and 120' respectively formed on the first gas diffusion layers 121 and 121'.

Each of the catalyst layers 110 and 110' is respectively an anode and a cathode.

The first gas diffusion layers 121 and 121' and the second gas diffusion layers 120 and 120' may be formed of, for example, a carbon cloth or carbon paper and diffuse oxygen and fuel supplied through the bipolar plates 20 throughout the catalyst layers 110 and 110'.

The fuel cell 1 including the MEA 10 operates at a temperature of about 100 to about 300° C. A fuel, for example, hydrogen, is supplied to the catalyst layer 110 (first catalyst layer) through one of the bipolar plates 20, and an oxidizer, for example, oxygen, is supplied to the catalyst layer 110' (second catalyst layer) through the other bipolar plate 20. Then, the fuel is oxidized to produce protons in the first catalyst layer 110, the electrolyte membrane 100 conducts the protons to the second catalyst layer, and the protons electrochemically react with the oxidizer in the second catalyst layer 110' to form water and generate electric energy.

In addition, hydrogen supplied as a fuel may be generated through the modification of hydrocarbon or alcohol, and oxygen supplied as an oxidizer may be supplied with air.

The electrolyte membrane 100 included in the MEA 10 will now be described. According to an embodiment, the electrolyte membrane 100 may include a phosphoric acid-based material and a proton conductor. In addition, the electrolyte membrane 100 may be any electrolyte membrane that is commonly used for a fuel cell.

Substituents in each of the formulae described above may be defined as follows but is not limited thereto. The aryl group in the formulae above may be used alone or in combination, and refers to a C6-C20 carbocyclic aromatic system containing at least one ring, wherein the rings may be attached to each other using a pedant method, or fused with each other. The term "aryl" refers to an aromatic radical, including a phenyl, a naphthyl, a tetrahydronaphthyl, or the like. The aryl group may have a substituent, such as a haloalkylene, a nitro, an alkoxy, and/or a lower alkylamino. At least one hydrogen atom of the aryl group may be substituted with the same substituents as in the aryl group as described above.

The heteroaryl group in the formulae above refers to a monocyclic or bicyclic aromatic organic compound, which contains at least one heteroatom selected from the group consisting of N, O, P, and S, and has 1 to 20 carbon atoms. At least one hydrogen atom of the heteroaryl group may be substituted with the same substituents as in the aryl group.

The alkyl group in the formulae above may be a methyl, an ethyl, a propyl, an isobutyl, a sec-butyl, a pentyl, an iso-amyl, a hexyl, or the like. At least one hydrogen atom of the alkyl group may be substituted with the same substituents as in the aryl group.

The heterocyclic group in the formulae above refers to a 5- to 10-membered ring containing a heteroatom, such as nitrogen, sulfur, phosphorus, oxygen, or the like. At least one hydrogen atom of the heterocyclic group may be substituted with the same substituents as in the aryl group.

The cycloalkyl group in the formulae above may be a C6-C20 carbocyclic group. At least one hydrogen atom of the cycloalkyl group may be substituted with the same substituents as in the aryl group.

Hereinafter, one or more embodiments of the present invention will be described in detail with reference to the following examples. However, these examples are not intended to limit the purpose and scope of the present invention.

Reaction Scheme 1

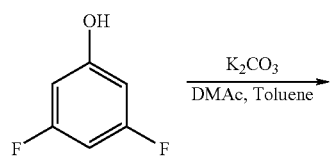

-continued
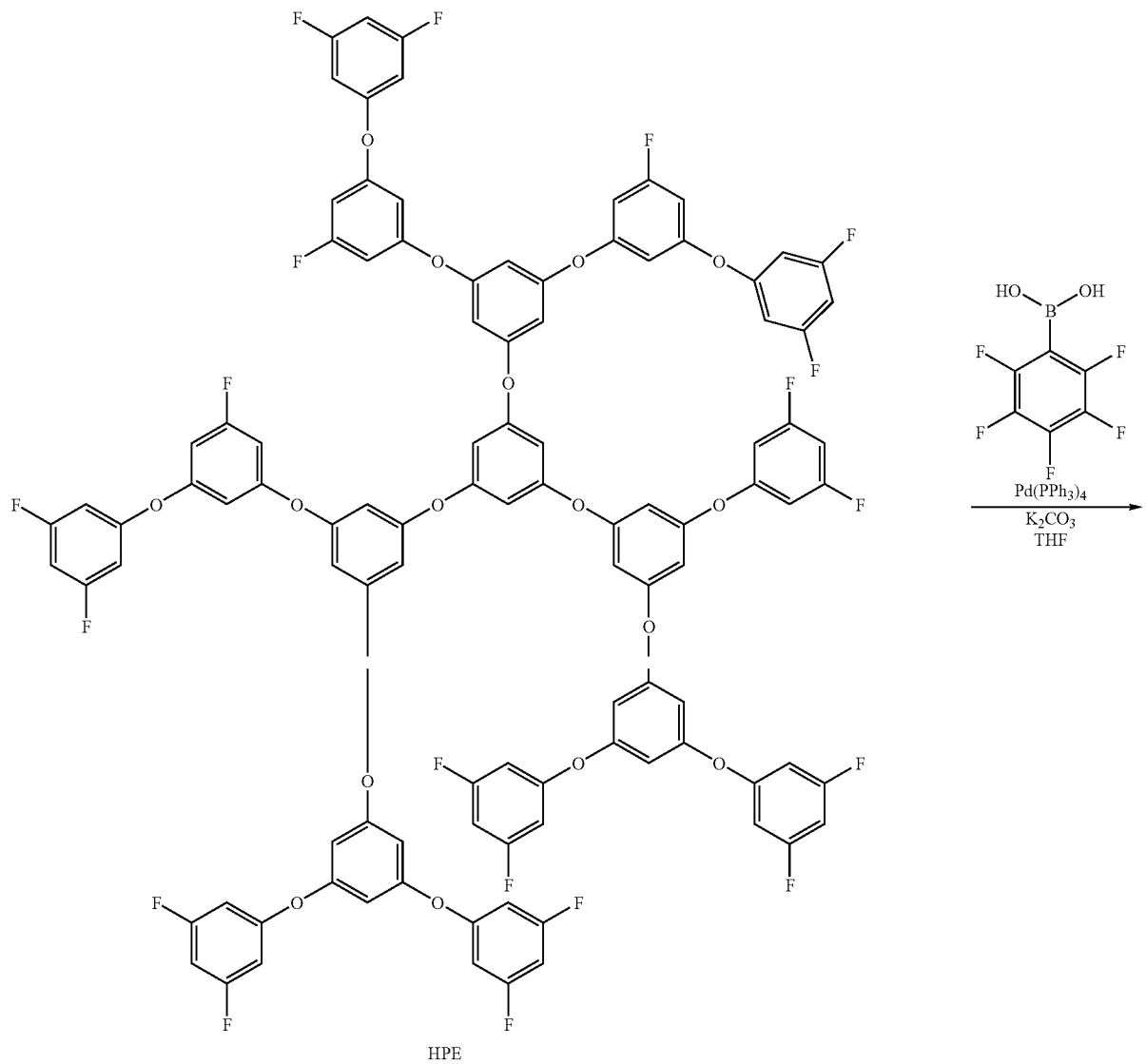
HPE

-continued

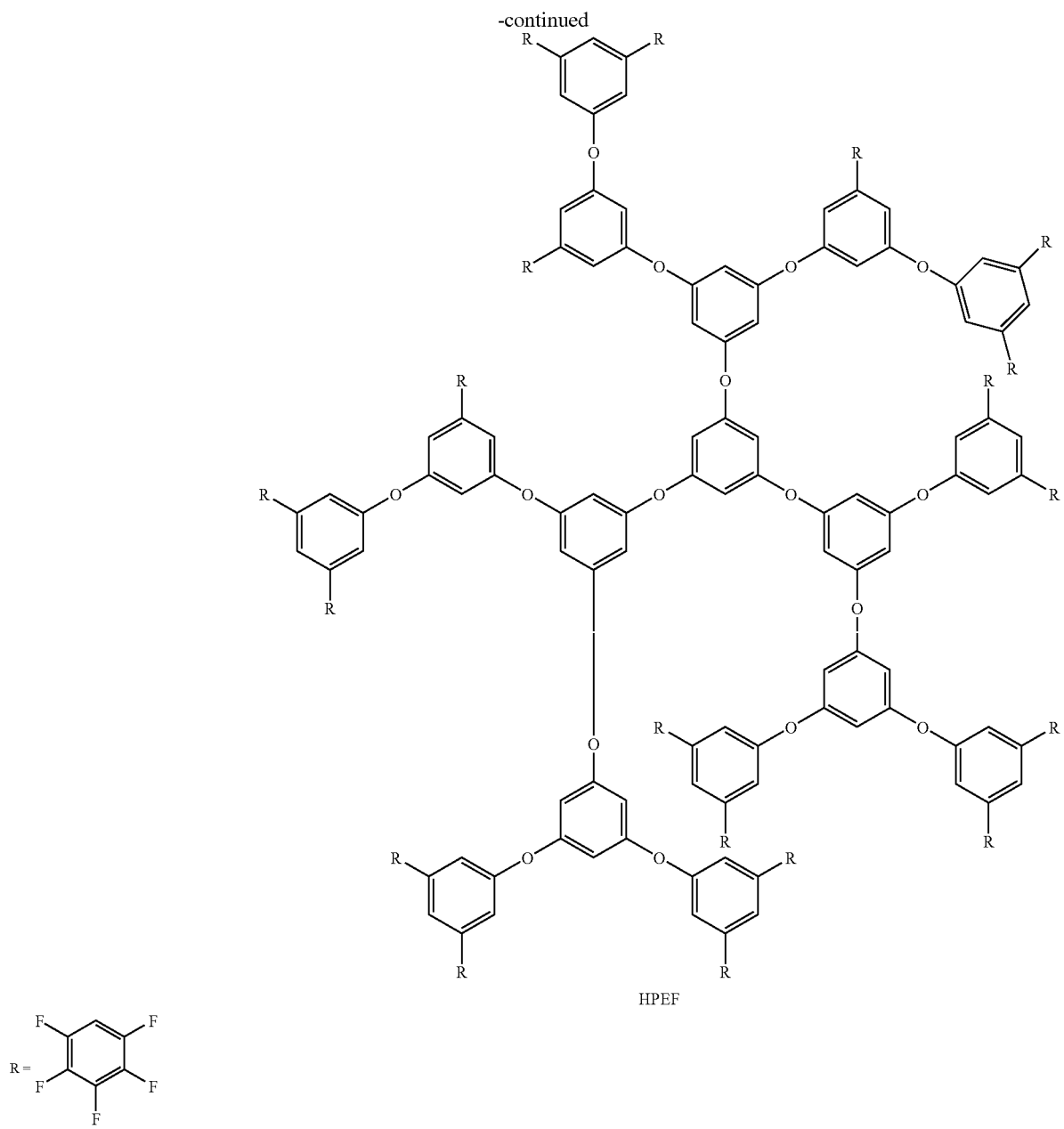

HPEF

Reaction Scheme 1 above illustrates a synthesis path of HPE according to Synthesis Example 1 and HPEF according to Synthesis Example 2.

Synthesis Example 1

Preparation of HPE of Formula 6

5 g of 3,5-difluorophenol was dissolved in 130 ml of dimethylacetamide, and 8 g of $K_2CO_3$ and 65 ml of toluene were added into the solution. The mixture was heated at about 175° C. while stirring, and toluene was removed from the reaction mixture by using a Dean-Stark trap. 65 mL of toluene was further added to the reaction mixture and stirred at about 140° C. Then, toluene was removed from the reaction mixture by using a Dean-Stark trap. The reaction mixture was heated to about 205° C. and stirred for 48 hours.

The reaction mixture was cooled to room temperature, and a reaction product was precipitated using water to obtain a precipitate. The obtained precipitate was filtered and dried in a vacuum oven to obtain HPE (hyper-branched polymer having a phenoxide unit as its building block) of Formula 6.

A structure and a degree of branching of the HPE of Formula 6 were identified using a nuclear magnetic resonance (NMR) analysis method. The results are shown in FIG. 1A. An analyzer used for the $^{13}$C-NMR analysis was a Bruker NMR 500 MHz (Model name: Avance 500), which is commercially available from Bruker Biospin.

The degree of branching of HPE was about 0.63. In FIGS. 1A, D, L, and T denote a peak relating to the dendritic unit, a peak relating to the linear unit, and a peak relating to the terminal unit, respectively. The degree of branching is calculated based on a ratio of a total integral value of the peaks D and T with respect to a total integral value of the peaks D, L and T.

Synthesis Example 2

Preparation of HPEF of Formula 7

1 g of HPE of Formula 6, synthesized according to Synthesis Example 1, and 2 g of pentafluoroboronic acid were dissolved in 30 ml of tetrahydrofurane (THF), and then 10 ml of a 2M aqueous $K_2CO_3$ solution was added to the solution. 0.38 g of $Pd(PPh_3)_4$ (Ph=phenyl) was added to the mixture and then refluxed for 24 hours.

When the reaction was completed, the reaction product was cooled to room temperature, and precipitated using hexane to obtain a precipitate. The obtained precipitate was washed with methanol, water, and then methanol, and dried in an oven to obtain HPEF (hyper-branched polymer having a phenoxide unit at its building block and a pentafluorophenyl group at its main terminal).

Figure 1B:
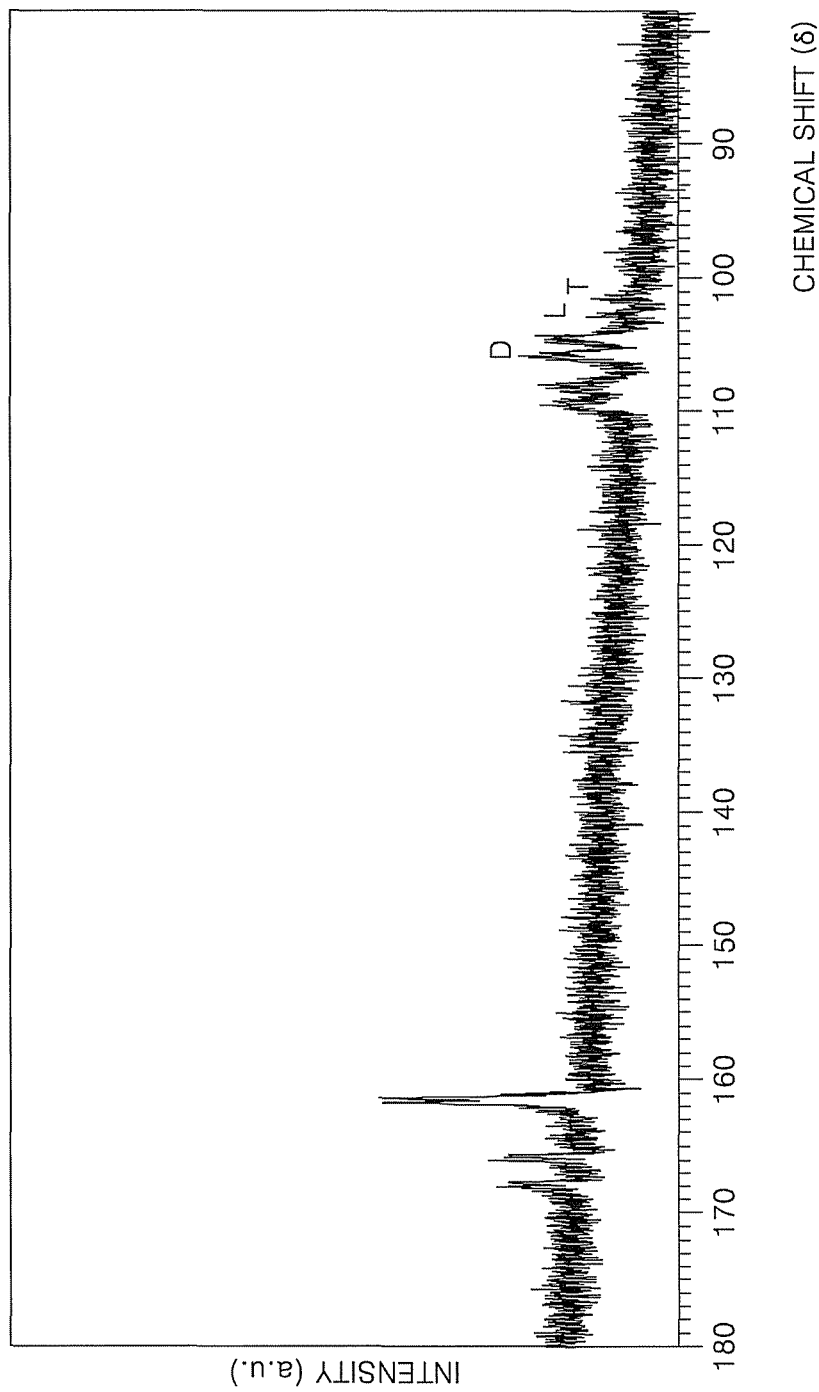
FIG. 1B is a $^{13}$C-NMR spectrum of HPEF of Formula 7 obtained in Synthesis Example 2.

A structure and a degree of branching of the HPEF of Formula 7 were identified using an NMR analysis method. The results are shown in FIG. 1B. An analyzer used for the $^{13}C$-NMR analysis was a Varian Unity iNOVA 600 operated at 600 MHz.

The degree of branching of HPEF was about 0.63. In FIGS. 1B, D, L, and T denote a peak relating to the dendritic unit, a peak relating to the linear unit, and a peak relating to the terminal unit, respectively. The degree of branching was calculated in the same manner as the case of FIG. 1A.

Figure 1C:
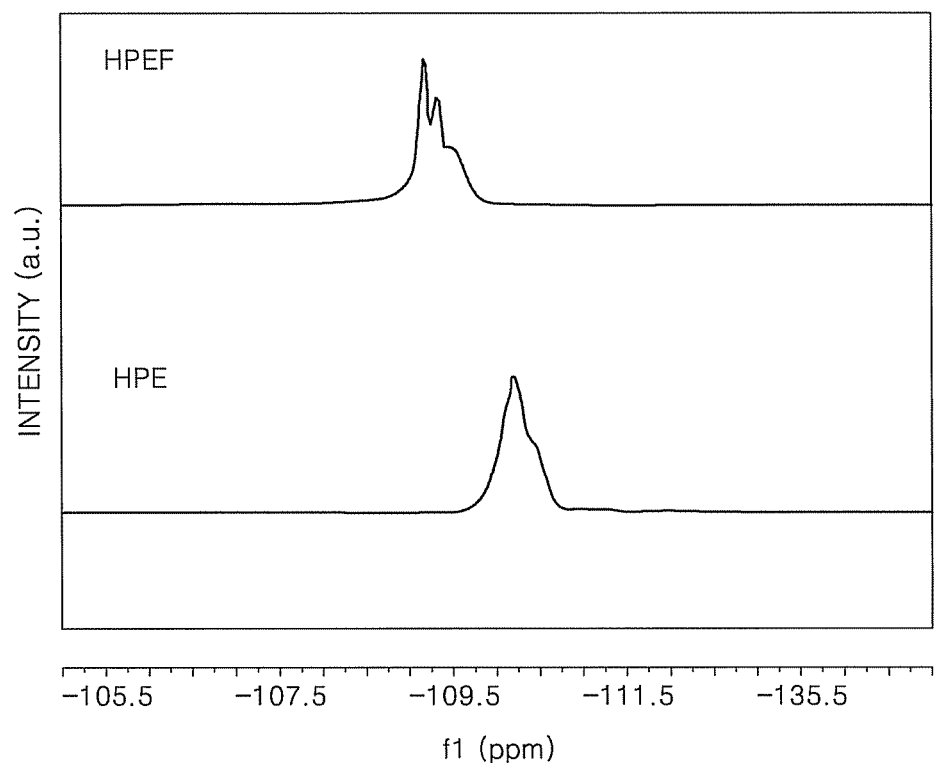
FIG. 1C is a $^{19}$F-NMR spectrum of the HPE of Synthesis Example 1 and the HPEF of Synthesis Example 2.

$^{19}F$-NMR was performed on the HPE obtained according to Synthesis Example 1 and the HPEF obtained according to Synthesis Example 2. The results are shown in FIG. 1C. An analyzer used for the $^{19}F$-NMR analysis was a Varian Unity iNOVA 600 operated at 600 MHz.

Figure 1D:
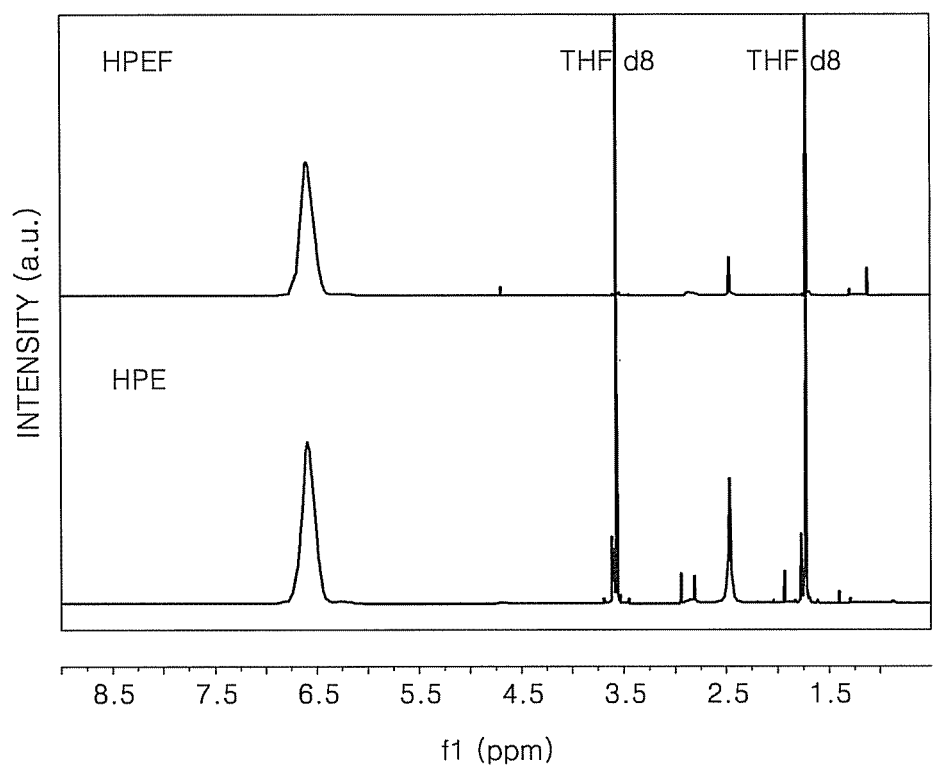
FIG. 1D is a $^{1}$H-NMR spectrum of the HPE of Synthesis Example 1 and the HPEF of Synthesis Example 2.

$^{1}H$-NMR was performed on the HPE obtained according to Synthesis Example 1 and the HPEF obtained according to Synthesis Example 2. In this regard, tetrahydrofuran-d8 (THF-d8) was used as a solvent for dissolving the HPE and the HPEF. The results are shown in FIG. 1D. An analyzer used for the $^{1}H$-NMR analysis was a Varian Unity iNOVA 600 operated at 600 MHz.

Figure 2:
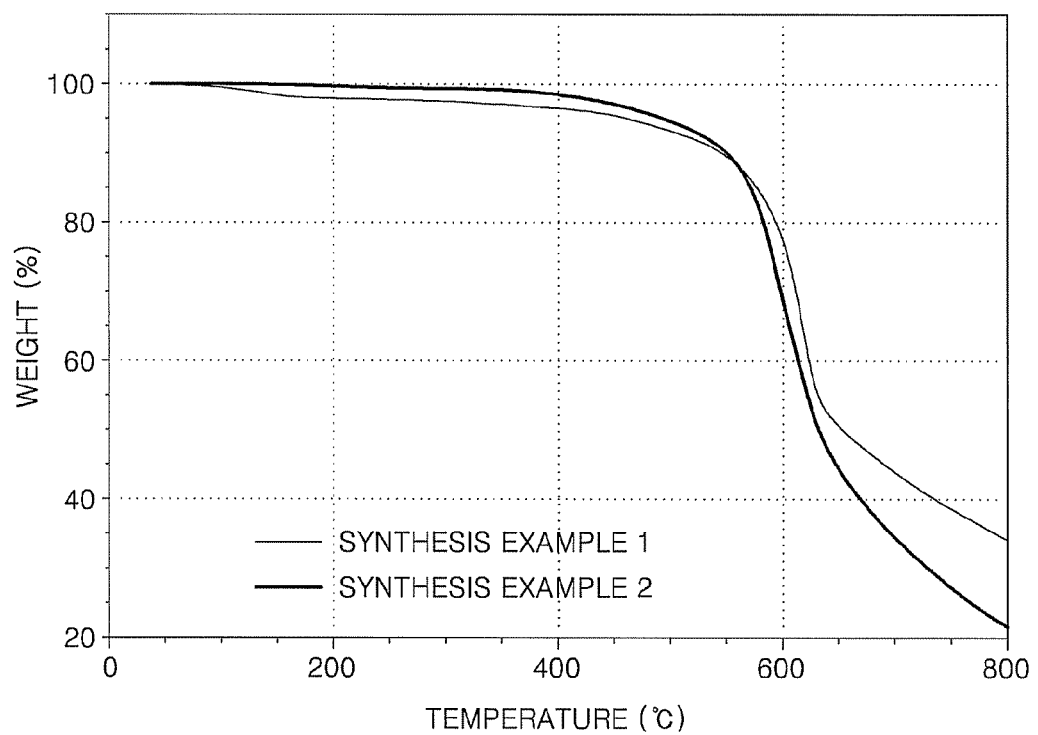
FIG. 2 illustrates thermal characteristics of the HPE of Synthesis Example 1 and the HPEF of Synthesis Example 2.

Thermal characteristics of the HPE obtained according to Synthesis Example 1 and the HPEF obtained according to Synthesis Example 2 were measured by thermogravimetric analysis (TGA). The results are shown in FIG. 2. The TGA was performed while increasing the temperature to 800° C. at a rate of 10° C./min and flowing nitrogen at a rate of 35 ml/min. Referring to FIG. 2, the HPE obtained according to Synthesis Example 1 and the HPEF obtained according to Synthesis Example 2 had excellent thermal stability.

The molecular weights of the HPE obtained in Synthesis Example 1 and the HPEF obtained in Synthesis Example 2 were measured using gel permeation chromatography (GPC). The results are shown in Table 1.

TABLE 1

| Compound | Mn | Mw | Mp | Mz | Mz + 1 | Polydispersity |
|---|---|---|---|---|---|---|
| HPE | 8358 | 20446 | 32098 | 30796 | 92345 | 2.44 |
| HPEF | 11711 | 21885 | 32398 | 32650 | 54132 | 1.88 |

In Table 1, Mn represents a number average molecular weight, Mw represents a weight average molecular weight, Mp represents a peak weight average molecular weight, Mz represents a z-weight average molecular weight, and Mz+1 represents a z+1 weight average molecular weight. Referring to Table 1, the HPEF had larger molecular weights than the HPE.

Example 1

Manufacture of Electrodes for Fuel Cells and a Fuel Cell Including the Electrodes 1 g of a catalyst including 50% by weight of PtCo loaded on carbon and 3 g of N-methylpyrolidone (NMP) as a solvent were added to a stirring vessel, and the mixture was agitated using a mortar to prepare a slurry. A solution of the HPE of Formula 6, obtained in Synthesis Example 1, in NMP was added to the slurry until the slurry contained 0.025 g of the HPF. The resultant slurry was further stirred.

Subsequently, a solution of 5 wt % of polyvinylidene fluoride in NMP was added to the mixture until the mixture contained 0.025 g of polyvinylidene fluoride. The resultant was mixed for 10 minutes to prepare a slurry for a cathode catalyst layer.

Carbon paper was cut to a size of 4×7 $cm^2$, fixed on a glass plate, and coated with the slurry by using a doctor blade (Sheen Instruments Ltd) having a gap of about 600 μm.

The coated carbon paper was dried at room temperature for one hour, at 80° C. for one hour, at 120° C. for 30 minutes, and at 150° C. for 15 minutes to form cathodes (fuel electrodes). The amount of Pt in PtCo loaded on the cathode was about 1.7 $mg/cm^2$.

Anodes were manufactured as follows. 2 g of a catalyst including 50 wt % of Pt supported on carbon and 9 g of NMP as a solvent were put into a stirring vessel, and the mixture was stirred for 2 minutes at a high speed.

Subsequently, a solution of 0.05 g of polyvinylidene fluoride dissolved in 1 g of NMP was added to the mixture, and the resultant was further stirred for 2 minutes to prepare a slurry for an anode catalyst layer. The slurry was coated on carbon paper, which was coated with a microporous layer using a bar coater, to complete the manufacture of the anode.

Separately, an electrolyte membrane was manufactured as follows. 60 parts by weight of a benzoxazine-based monomer A represented by a formula below, 3 parts by weight of a benzoxazine-based monomer B represented by a formula below, and 37 parts by weight of polybenzimidazole were blended together, and then cured at about 220° C.

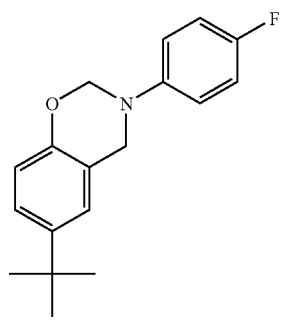

Benzoxazine-based monomer A

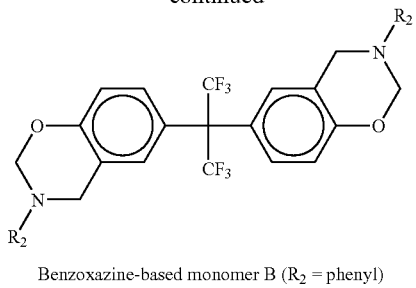

Benzoxazine-based monomer B (R₂ = phenyl)

The resultant was impregnated with 85 wt % of phosphoric acid at 80° C. for 4 hours to form an electrolyte membrane. Herein, the amount of phosphoric acid was about 480 parts by weight based on 100 parts by weight of the electrolyte membrane.

The electrolyte membrane was disposed between the cathode and the anode to manufacture an MEA. The cathode and the anode were not impregnated with phosphoric acid.

To prevent gas permeation between the cathode and the anode, a TEFLON® membrane main-gasket having a thickness of 200 μm and a TEFLON membrane sub-gasket having a thickness of 20 μm were joined and disposed between each of the anode and cathode and the electrolyte membrane. The pressure applied to the MEAs was adjusted using a torque wrench and was stepwise increased using 1, 2, and 3 N-m Torque wrenches.

Electricity was generated by supplying hydrogen to the anode (flow rate: 100 ccm) and air to the cathode (flow rate: 250 ccm) at 150° C. without humidifying the electrolyte membrane, and characteristics of the fuel cell were measured. Herein, an electrolyte doped with phosphoric acid was used, and thus, the performance of the fuel cell was improved over time. Thus, aging was performed until an operating voltage reached a peak voltage, and finally, the characteristics of the fuel cell were evaluated. In addition, the surface areas of the cathode and the anode were fixed to 2.8×2.8 (7.84 cm²). The thickness of the cathode was about 430 μm, and the thickness of the anode was about 390 μm.

Example 2

Manufacture of Electrodes for Fuel Cells and a Fuel Cell Including the Electrodes A cathode and a fuel cell including the cathode were manufactured in the same manner as in Example 1, except that HPEF of Formula 7, instead of HPE of Formula 6, and polyurethane, instead of polyvinylidene fluoride (PVDF), were used to manufacture the cathode.

Example 3

Manufacture of Electrodes and an Electrolyte Membrane for Fuel Cells, and a Fuel Cell Including the Same 1 g of a catalyst including 50% by weight of PtCo loaded on carbon, and 3 g of N-methylpyrolidone (NMP) as a solvent were added to a stirring vessel, and the mixture was agitated using a mortar to prepare a slurry. A solution of the HPEF of Formula 7, obtained in Synthesis Example 2, in NMP was added to the slurry until the slurry contained 0.025 g of the HPEF. The resultant slurry was further stirred.

Subsequently, a solution of 5 wt % of polyvinylidene fluoride in NMP was added to the mixture until the mixture contained 0.025 g of polyvinylidene fluoride. The resultant was mixed for 10 minutes to prepare a slurry for a cathode catalyst layer.

Carbon paper was cut to a size of 4×7 cm², fixed on a glass plate, and coated with the slurry by using a doctor blade (Sheen Instruments Ltd) having a gap of about 600 μm.

The coated carbon paper was dried at room temperature for one hour, at 80° C. for one hour, at 120° C. for 30 minutes, and at 150° C. for 15 minutes to form cathodes (fuel electrodes). The amount of Pt in PtCo loaded on the cathode was about 1.7 mg/cm².

Anodes were manufactured as follows. 2 g of a catalyst including 50 wt % of Pt supported on carbon and 9 g of NMP as a solvent were put into a stirring vessel, and the mixture was stirred for 2 minutes at a high speed.

Subsequently, a solution of 0.05 g of polyvinylidene fluoride dissolved in 1 g of NMP was added to the mixture, and the resultant was further stirred for 2 minutes to prepare a slurry for an anode catalyst layer. The slurry was coated on carbon paper, which was coated with a microporous layer using a bar coater, to complete the manufacture of the anode.

Separately, an electrolyte membrane was manufactured as follows. 60 parts by weight of a benzoxazine-based monomer 4FPH-2AP represented by the following formula, 37 parts by weight of m-polybenzimidazole (m-PBI), and 3 parts by weight of the HPEF of Formula 7 were blended together, and then cured at about 220° C.

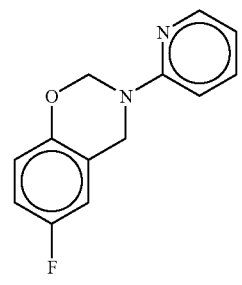

4FPH-2AP

Subsequently, the resultant was impregnated with 85 wt % of phosphoric acid at 80° C., for 4 hours to form an electrolyte membrane. Herein, the amount of phosphoric acid was about 480 parts by weight based on 100 parts by weight of the electrolyte membrane.

The electrolyte membrane was disposed between the cathode and the anode to manufacture an MEA. The cathode and the anode were not impregnated with phosphoric acid.

To prevent gas permeation between the cathode and the anode, a TEFLON membrane main-gasket having a thickness of 200 μm and a TEFLON membrane sub-gasket having a thickness of 20 μm were joined and disposed between each of the anode and cathode electrodes and the electrolyte membrane. The pressure applied to the MEAs was adjusted using a torque wrench and was stepwise increased using 1, 2, and 3 N-m Torque wrenches.

Electricity was generated by supplying hydrogen to the anode (flow rate: 100 ccm) and air to the cathode (flow rate: 250 ccm) at 150° C. without humidifying the electrolyte membrane, and characteristics of the fuel cell were measured. Herein, an electrolyte doped with phosphoric acid was used, and thus, the performance of the fuel cell was improved over time. Thus, aging was performed until an operating voltage reached a peak voltage, and finally, the characteristics of the fuel cell were evaluated. In addition, the surface areas of the cathode and the anode were fixed to 2.8×2.8 (7.84 cm²). The thickness of the cathode was about 430 μm, and the thickness of the anode was about 390 μm.

Example 4

Manufacture of Electrodes for Fuel Cells and a Fuel Cell Including the Electrodes

A cathode and a fuel cell including the cathode were manufactured in the same manner as in Example 1, except that HPEF of Formula 7, instead of HPE of Formula 6, and polyurethane, instead of polyvinylidene fluoride (PVDF), were used to manufacture the cathode, and the amount of PtCo loaded on the cathode was varied such that the loading amount of Pt in the cathode reached about 1.16 mg/cm².

Example 5

Manufacture of Electrodes for Fuel Cells and a Fuel Cell Including the Electrodes

A cathode and a fuel cell including the cathode were manufactured in the same manner as in Example 1, except the amount of PtCo loaded on the cathode was varied such that the loading amount of Pt in the cathode reached about 1.35 mg/cm².

Comparative Example 1

Manufacture of Electrodes for Fuel Cells and a Fuel Cell Including the Electrodes

Electrodes and a fuel cell including the electrodes were manufactured in the same manner as in Example 1, except that the HPE of Formula 6, obtained in Synthesis Example 1, was not added when the cathode was manufactured.

Figure 3:
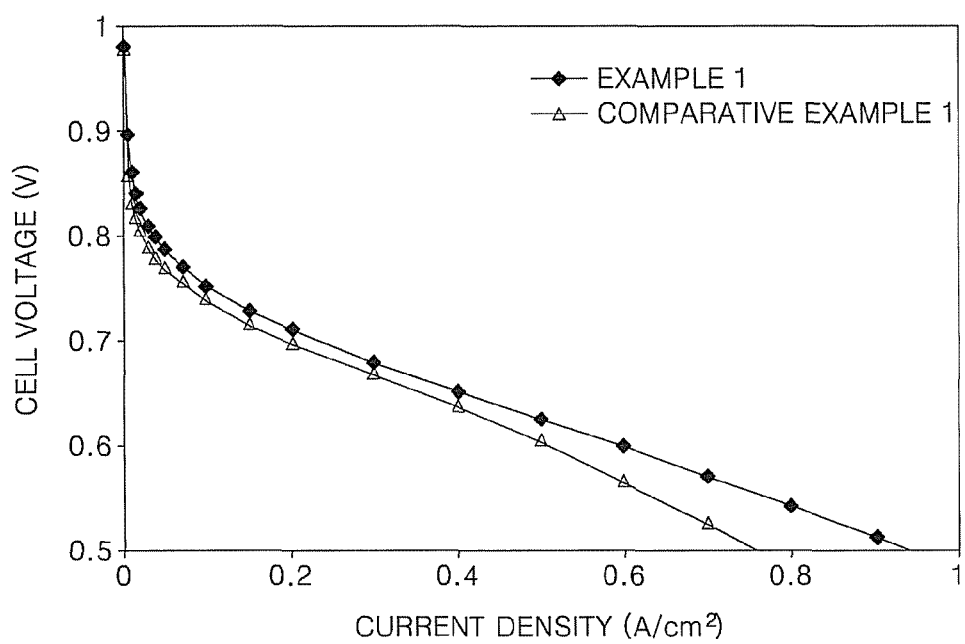
FIG. 3 is a graph of voltage with respect to current density of fuel cells manufactured according to Example 1 and Comparative Example 1.

Cell voltages with respect to current density were measured using the fuel cells manufactured according to Example 1 and Comparative Example 1. The results are shown in FIG. 3. Referring to FIG. 3, cell voltage characteristics were improved in the fuel cell of Example 1 as compared to Comparative Example 1.

Figure 4:
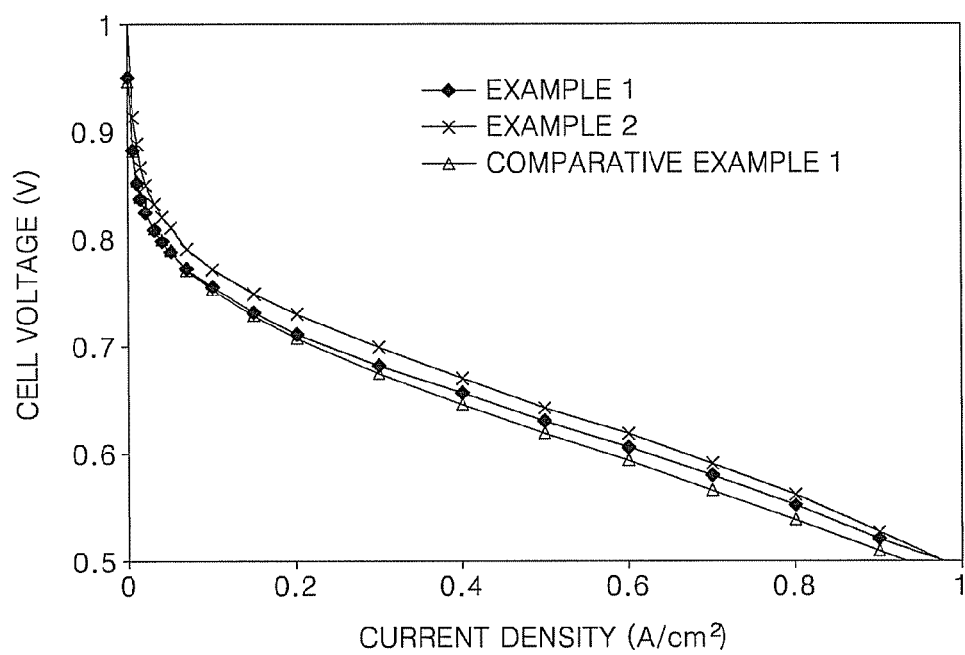
FIG. 4 is a graph of voltage with respect to current density of fuel cells manufactured according to Examples 1 and 2 and Comparative Example 1.

The voltages of the fuel cells prepared in Examples 1 and 2 and Comparative Example 1 were measured at different current densities. The results are shown in FIG. 4. Referring to FIG. 4, the fuel cells of Examples 1 and 2 had improved cell voltage characteristics as compared to the fuel cell of Comparative Example 1. In addition, the fuel cell of Example 2 manufactured using polyurethane as a cathode binder had better cell voltage characteristics than those of the fuel cell of Example 1 manufactured using PVDF as a cathode binder.

Figure 5:
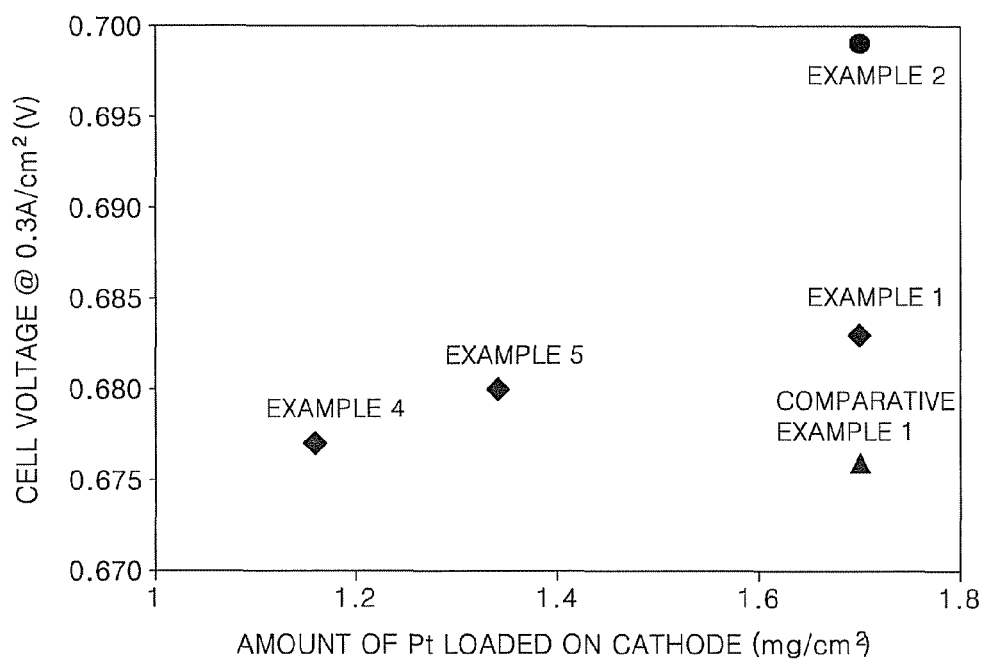
FIG. 5 is a graph of voltage with respect to the amount of platinum (Pt) loaded on cathodes of the fuel cells of Examples 1 and 2 and Comparative Example 1.

Cell voltage characteristics of the fuel cells manufactured in Examples 1, 2, 4 and 5 and Comparative Example 1 with respect to the loading amount of Pt in the cathode were measured. The results are shown in FIG. 5. Referring to FIG. 5, the fuel cells of Examples 1 and 2 had improved cell voltage characteristics as compared to the fuel cell of Comparative Example 1. In addition, the fuel cells of Examples 4 and 5 had equivalent or excellent performance as compared to that of the fuel cell manufactured in Comparative Example 1, even using smaller amounts of Pt than used in Comparative Example 1.

Figure 6:
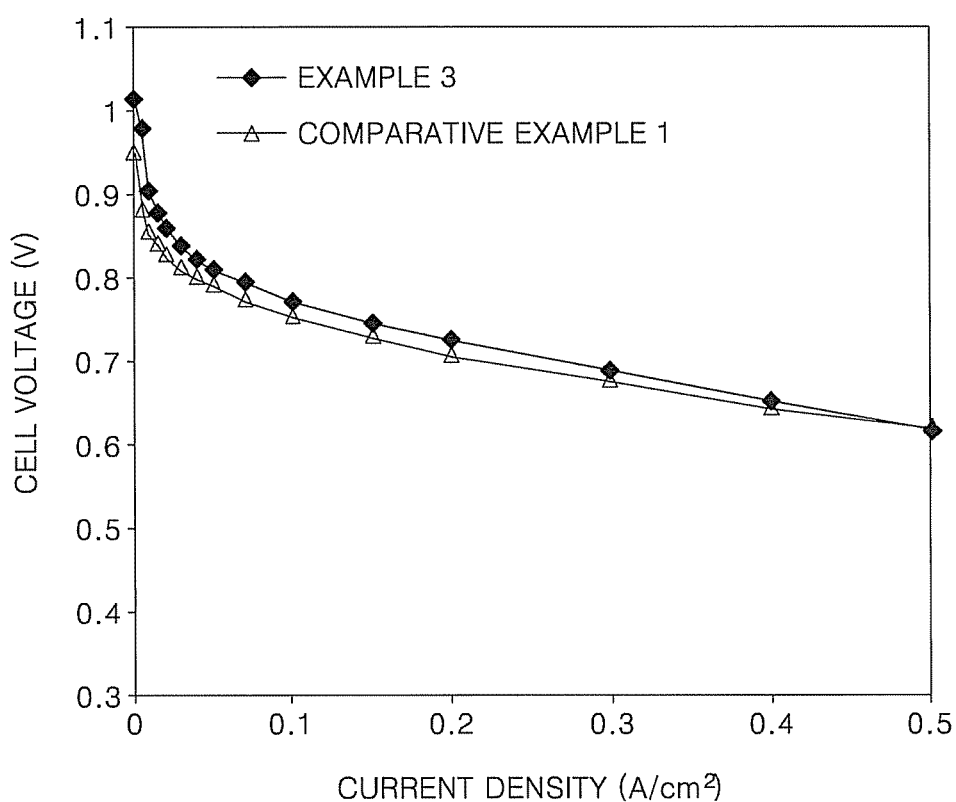
FIG. 6 is a graph of voltage with respect to current density of fuel cells manufactured according to Example 3 and Comparative Example 1.
Figure 7:
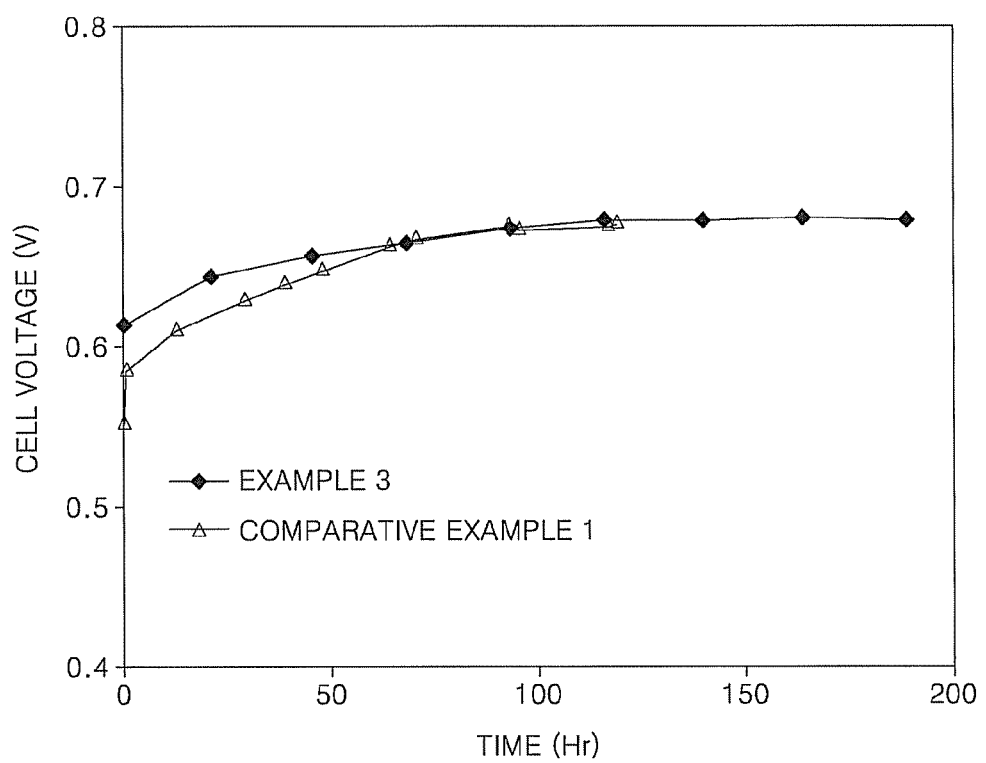
FIG. 7 is a graph of cell voltage with respect to time of the fuel cells manufactured according to Example 3 and Comparative Example 1.

In addition, cell voltage characteristics of the fuel cells of Example 3 and Comparative Example 1 were measured with respect to current density and time. The results are shown in FIGS. 6 and 7. Referring to FIGS. 6 and 7, the fuel cell of Example 3 had improved cell voltage characteristics as compared to the fuel cell of Comparative Example 1.

Oxygen solubility of the fuel cell of Example 3 was measured as follows. Phosphoric acid and a phosphoric acid solution containing 0.1 wt % of HPEF dissolved in phosphoric acid were purged with argon or oxygen. Then, oxygen reduction reaction in each of the solutions was scanned within a voltage ratio of 0V to 1.2V, and currents in a range of 0.2V and 0.4V were measured. The absolute values of the currents were compared. A greater absolute value of a current was evaluated as indicating greater oxygen solubility. The phosphoric acid was a phosphoric acid solution containing about 85% phosphoric acid.

Figure 8A:
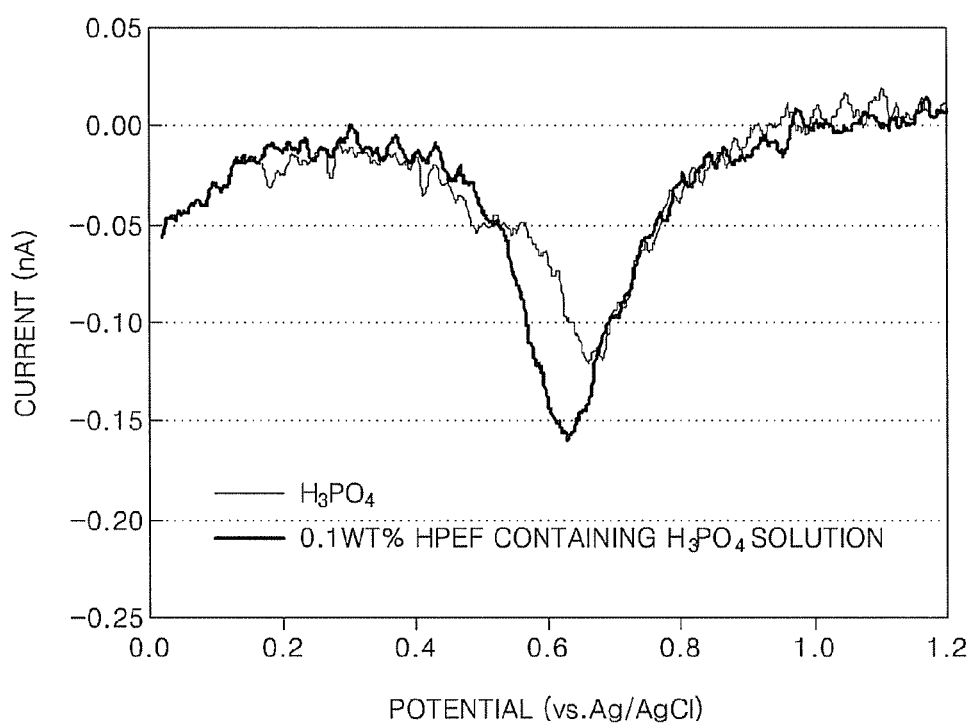
FIGS. 8A and 8B are results of oxygen solubility measurement on the fuel cell manufactured according to Example 3.
Figure 8B:
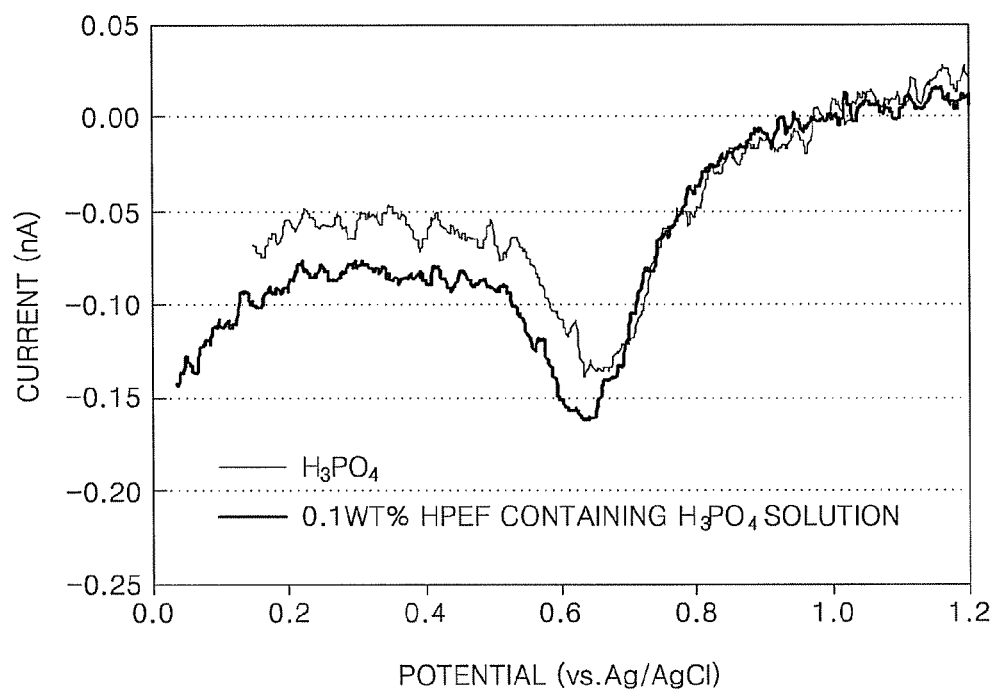

The results of the oxygen solubility measurement were shown in FIGS. 8A and 8B. FIG. 8A is a graph of current against potential when oxygen reduction was induced in phosphoric acid and the 0.1 wt % HPEF-containing phosphoric acid solution purged with argon. FIG. 8B is a graph of current against potential when oxygen reduction was induced in phosphoric acid and the 0.1 wt % HPEF-containing phosphoric acid solution purged with oxygen.

Referring to FIG. 8A, oxygen reduction was detected neither in the phosphoric acid purged with argon nor in the 0.1 wt % HPEF-containing phosphoric acid solution purged with argon. Referring to FIG. 8B, when the phosphoric acid and the 0.1 wt % HPEF-containing phosphoric acid solution were purged with oxygen, oxygen reduction was observed in the range of 0.2V to 0.4V. In addition, the oxygen reduction current was higher in the 0.1 wt % HPEF-containing phosphoric acid solution than in the phosphoric acid. This result indicates that the oxygen solubility in phosphoric acid was increased when HPEF was added into the phosphoric acid.

As described above, when a hyper-branched polymer having excellent thermal resistance and phosphoric acid resistance or a cross-linked material of the hyper-branched polymer, the cross-linked material having excellent thermal resistance and phosphoric acid resistance, is used in an electrode or an electrolyte membrane of a fuel cell, cell performance of the fuel electrolyte may be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode for a fuel cell, the electrode comprising a hyper-branched polymer having a degree of branching in the range of about 0.05 to about 1 comprising:
   a dendritic unit represented by Formula 1;
   a linear unit represented by Formula 2; and
   a terminal unit represented by Formula 3,
   wherein

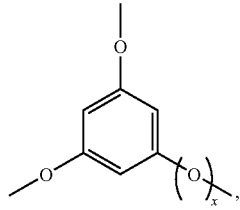

Formula 1

-continued

Formula 2

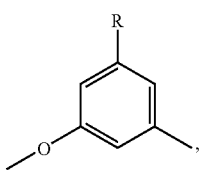

Formula 3

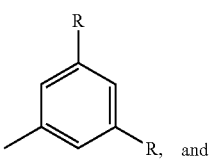

wherein x is 0 or 1, and each R is independently fluorine, a $C_1$-$C_{20}$ fluorinated alkyl group, a $C_6$-$C_{20}$ fluorinated aryl group, a $C_2$-$C_{20}$ fluorinated heteroaryl group, a $C_6$-$C_{20}$ fluorinated cycloalkyl group, or a $C_2$-$C_{20}$ fluorinated heterocyclic group.

2. An electrolyte membrane for a fuel cell, the electrolyte membrane comprising a hyper-branched polymer having a degree of branching in the range of about 0.05 to about 1 comprising:
    a dendritic unit represented by Formula 1;
    a linear unit represented by Formula 2; and
    a terminal unit represented by Formula 3,
    wherein Formula 1

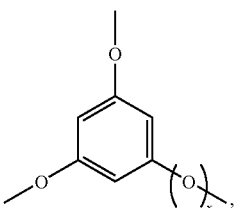

Formula 2

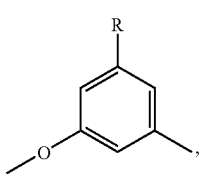

Formula 3

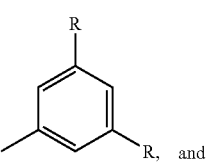

wherein x is 0 or 1, and each R is independently fluorine, a $C_1$-$C_{20}$ fluorinated alkyl group, a $C_6$-$C_{20}$ fluorinated aryl group, a $C_2$-$C_{20}$ fluorinated heteroaryl group, a $C_6$-$C_{20}$ fluorinated cycloalkyl group, or a $C_2$-$C_{20}$ fluorinated heterocyclic group.

3. A fuel cell comprising:
    a cathode;
    an anode; and
    an electrolyte membrane disposed between the cathode and the anode,
    wherein at least one of the cathode, the anode, and the electrolyte membrane comprises a hyper-branched polymer having a degree of branching in the range of about 0.05 to about 1 comprising:
    a dendritic unit represented by Formula 1;
    a linear unit represented by Formula 2; and
    a terminal unit represented by Formula 3,
    wherein Formula 1

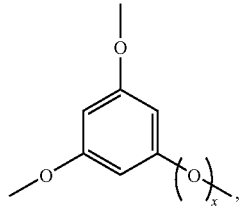

Formula 2

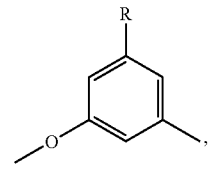

Formula 3

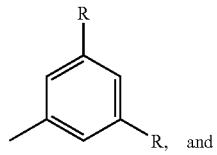

wherein x is 0 or 1, and each R is independently fluorine, a $C_1$-$C_{20}$ fluorinated alkyl group, a $C_6$-$C_{20}$ fluorinated aryl group, a $C_2$-$C_{20}$ fluorinated heteroaryl group, a $C_6$-$C_{20}$ fluorinated cycloalkyl group, or a $C_2$-$C_{20}$ fluorinated heterocyclic group.

4. The fuel cell of claim 3, wherein at least one of the cathode and the anode comprises a catalyst layer comprising a catalyst and about 0.001 to about 0.65 parts by weight of the hyper-branched polymer with respect to 1 part by weight of the catalyst.

5. The fuel cell of claim 4, wherein the catalyst comprises platinum (Pt); or
    an alloy or mixture of platinum (Pt) and at least one metal selected from the group consisting of gold (Au), palladium (Pd), rhodium (Rh), iridium (Ir), ruthenium (Ru), tin (Sn), molybdenum (Mo), cobalt (Co), and chromium (Cr).

6. The fuel cell of claim 4, wherein the catalyst comprises a catalytic metal, or a supported catalyst including a carbonaceous support and a catalytic metal supported on the carbonaceous support.

7. The fuel cell of claim 4, further comprising at least one binder selected from the group consisting of poly(vinylidenefluoride), polytetrafluoroethylene (PTFE), a tetrafluoroethylene-hexafluoroethylene copolymer, a fluorinated ethylene propylene (FEP), a styrene butadiene rubber (SBR), polyurethane, and combinations thereof.

8. The fuel cell of claim 7, wherein the binder comprises polyurethane.

9. The fuel cell of claim 3, wherein the at least one of the cathode, the anode, and the electrolyte membrane comprising the hyper-branched polymer further comprises at least one proton conductor selected from a phosphoric acid and a $C_1$-$C_{20}$ organic phosphonic acid.

10. The electrode for a fuel cell of claim 1, comprising a core unit that links with the dendritic unit, the linear unit, and the terminal unit, the core unit being represented by Formula 4 below:

Formula 4

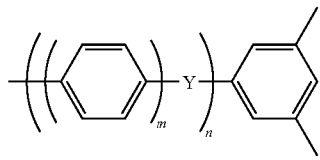

wherein Y is —SO$_2$—, —C(CH$_3$)$_2$—, —C(CF$_3$)$_2$—, —N=N—, or —O—, m is a number in the range of about 0 to about 3, and n is a number in the range of about 0 to about 1.

11. The electrode for a fuel cell of claim 10, wherein the core unit of Formula 4 comprises a unit represented by the following formula:

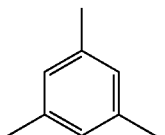

12. The electrode for a fuel cell of claim 1, wherein each R is independently fluorine, a trifluoromethyl group, a 3,5-difluorophenyl group, or one group selected from the groups represented by the following formulae:

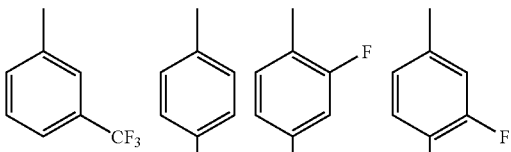

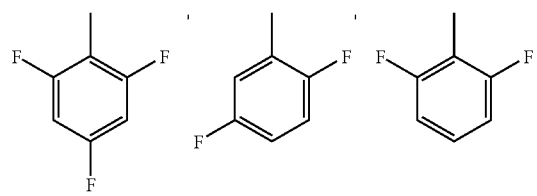

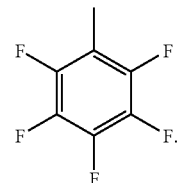

13. The electrode for a fuel cell of claim 1, wherein the degree of branching is in the range of about 0.63 to about 0.9.

14. The electrode for a fuel cell of claim 1, comprising a compound represented by Formula 5 below:

Formula 5

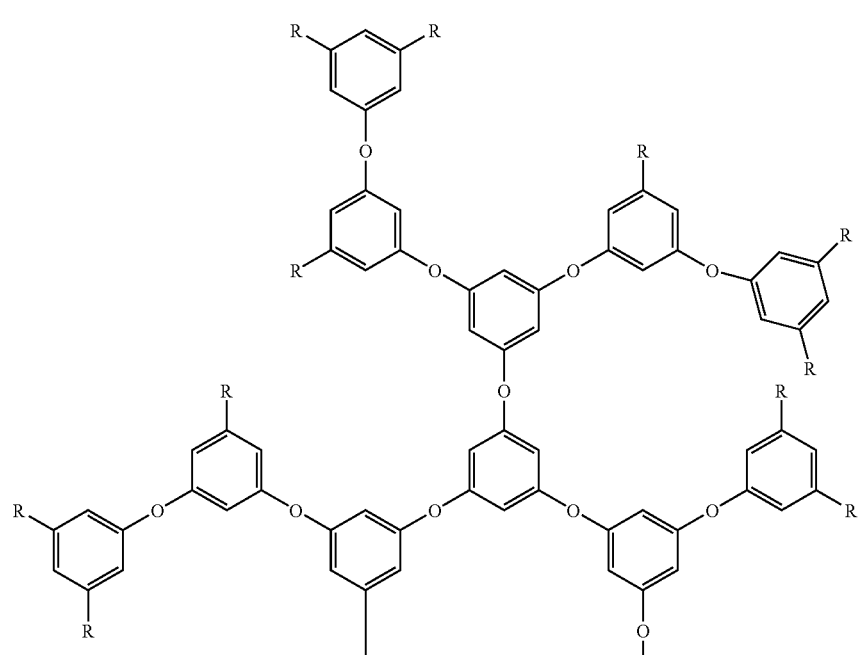

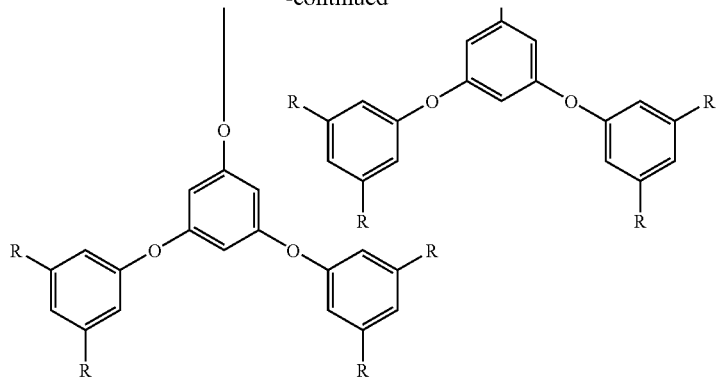
wherein R is fluorine, a trifluoromethyl group, a 3,5-difluorophenyl group, or one group selected from the groups represented by the following formulae:
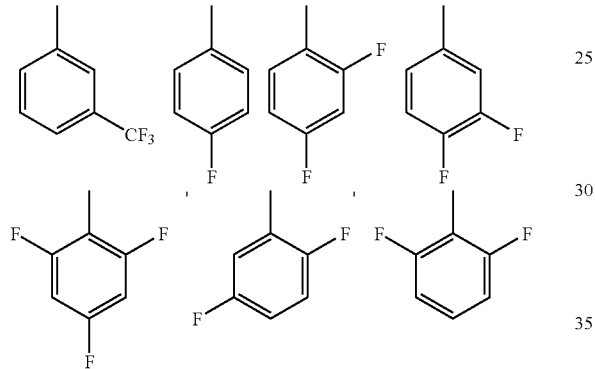
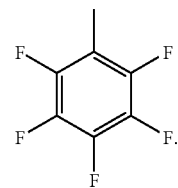
15. The electrode for a fuel cell of claim 1, comprising a compound represented by Formula 6 below:
Formula 6
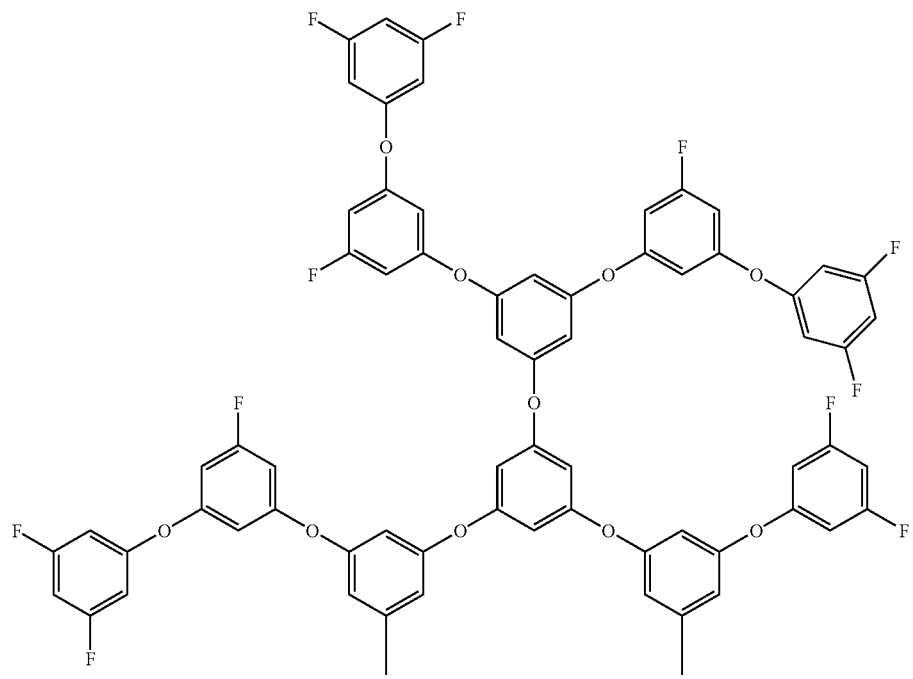

-continued
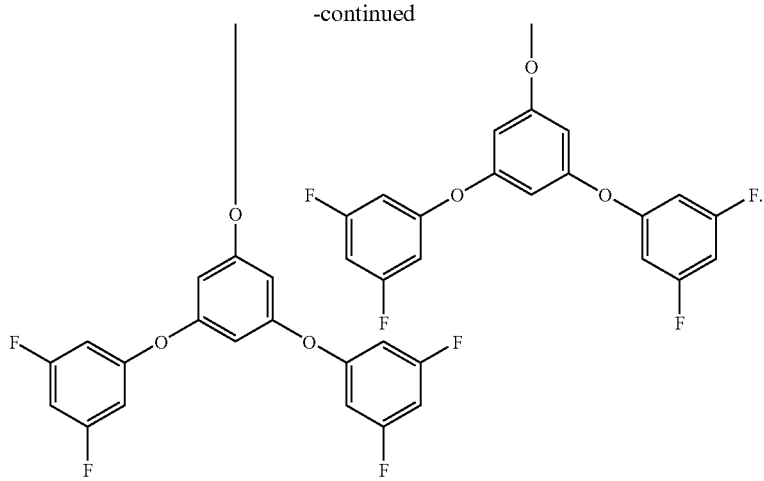
16. The electrode for a fuel cell of claim 1, comprising a compound represented by Formula 7 below:
Formula 7
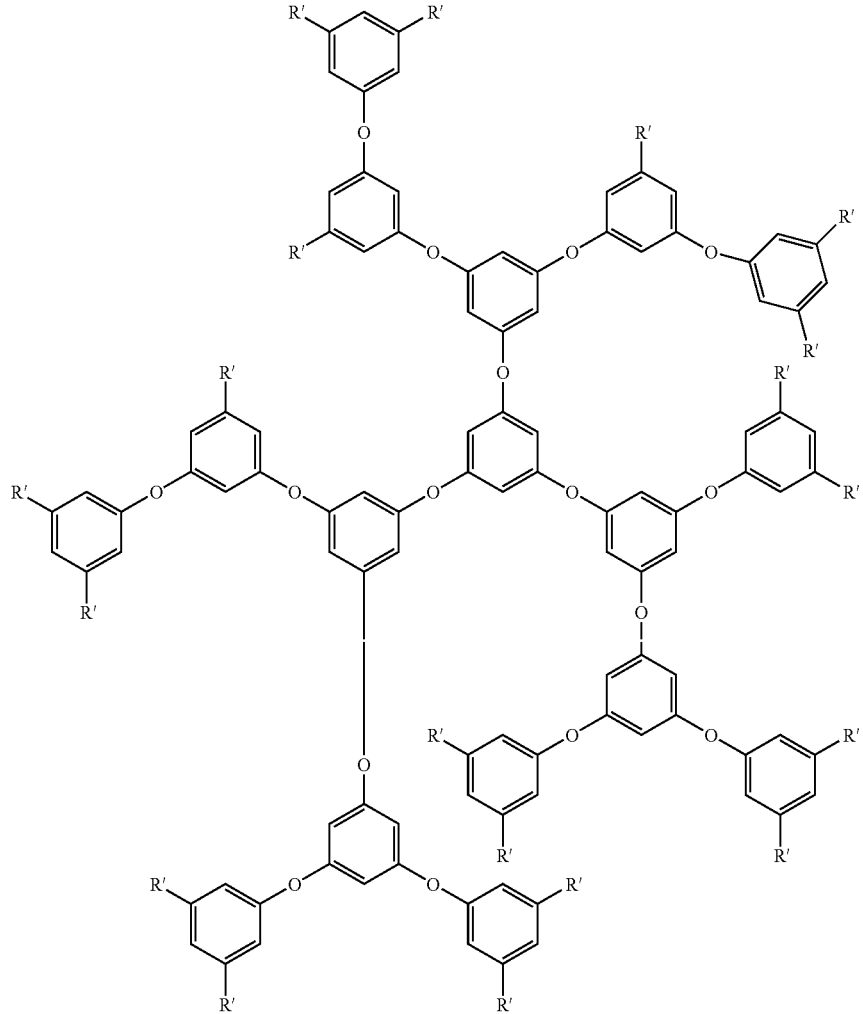
wherein R' is a pentafluorophenyl group.

17. The electrode for a fuel cell of claim 2, comprising a core unit that links with the dendritic unit, the linear unit, and the terminal unit, the core unit being represented by Formula 4 below:

Formula 4

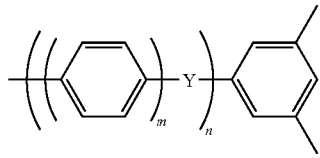

wherein Y is —SO$_2$—, —C(CH$_3$)$_2$—, —C(CF$_3$)$_2$—, —N═N—, or —O—, m is a number in the range of about 0 to about 3, and n is a number in the range of about 0 to about 1.

18. The electrode for a fuel cell of claim 17, wherein the core unit of Formula 4 comprises a unit represented by the following formula:

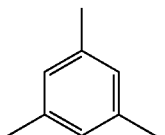

19. The electrode for a fuel cell of claim 2, wherein each R is independently fluorine, a trifluoromethyl group, a 3,5-difluorophenyl group, or one group selected from the groups represented by the following formulae:

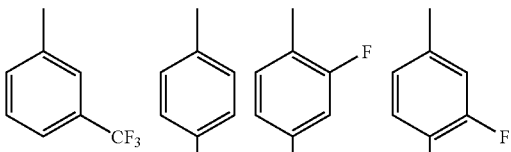

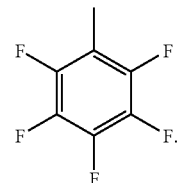

20. The electrode for a fuel cell of claim 2, wherein the degree of branching is in the range of about 0.63 to about 0.9.

21. The electrode for a fuel cell of claim 2, comprising a compound represented by Formula 5 below:

Formula 5

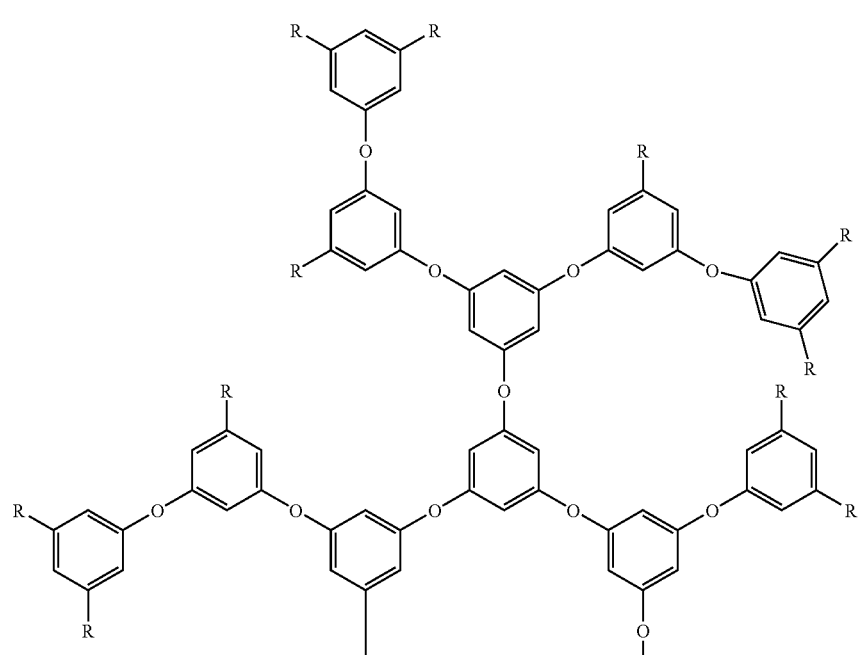

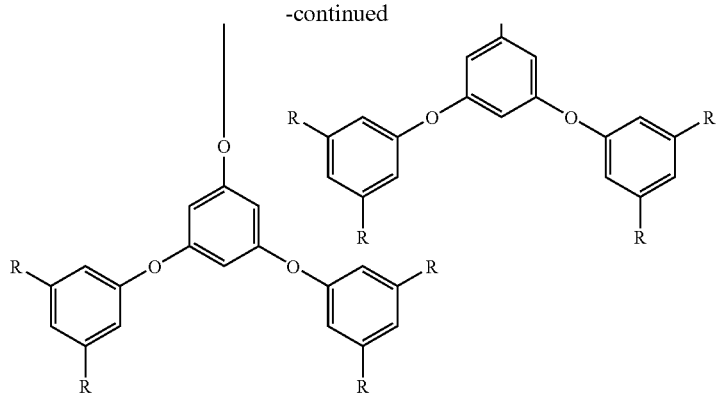
wherein R is fluorine, a trifluoromethyl group, a 3,5-difluorophenyl group, or one group selected from the groups represented by the following formulae:
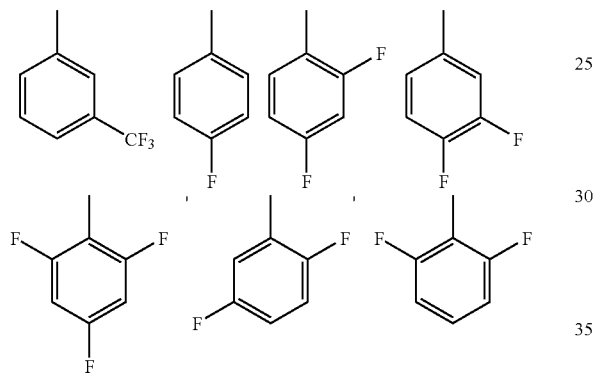
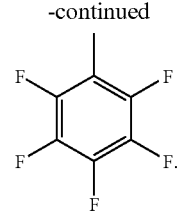
22. The electrode for a fuel cell of claim 2, comprising a compound represented by Formula 6 below:
Formula 6
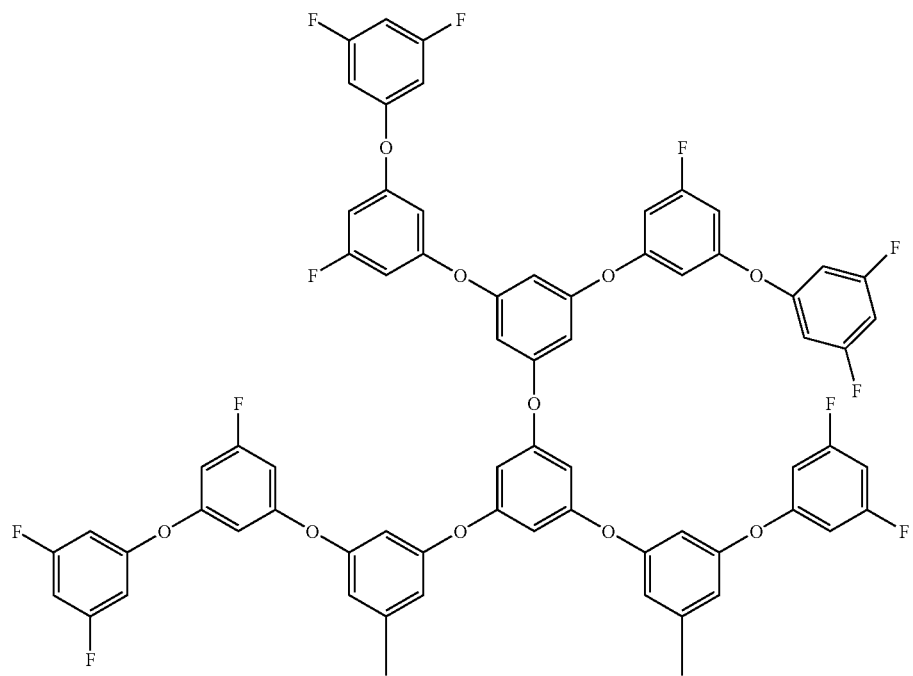

-continued
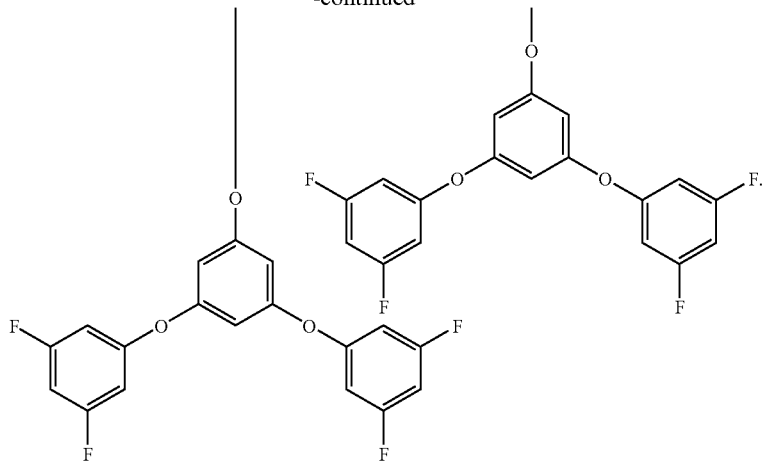
23. The electrode for a fuel cell of claim 2, comprising a compound represented by Formula 7 below:
Formula 7
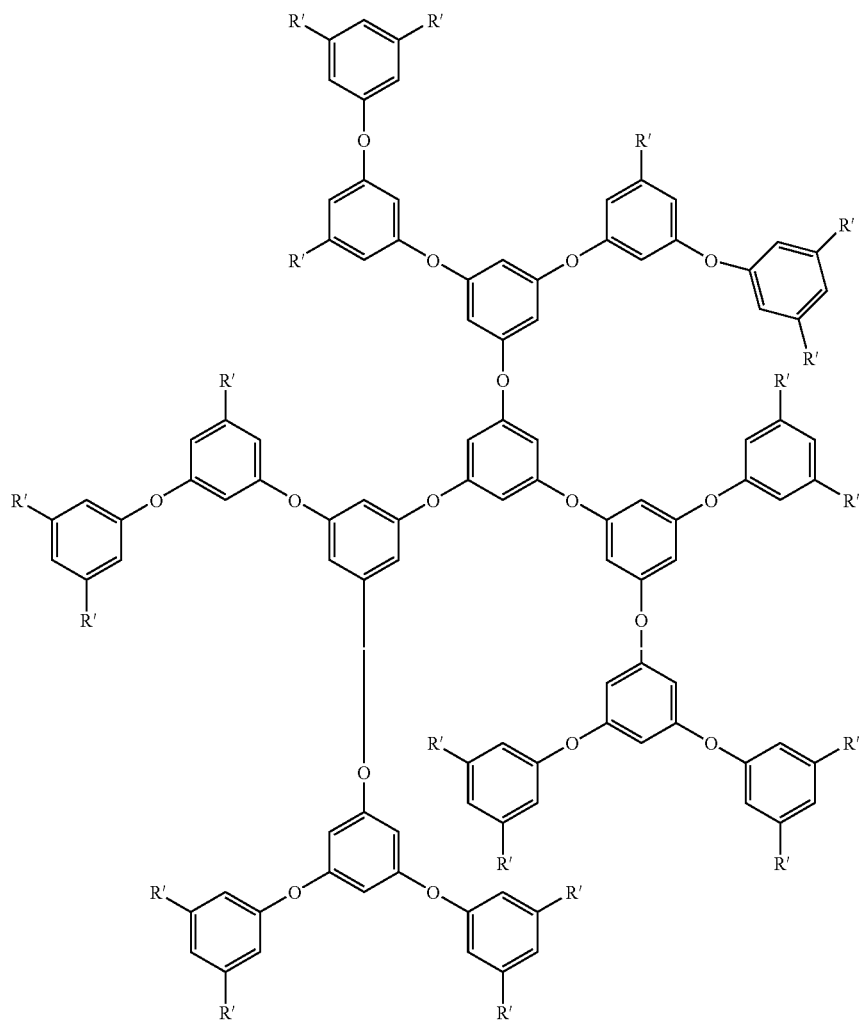
wherein R' is a pentafluorophenyl group.
* * * * *